(12) United States Patent
Abedini et al.

(10) Patent No.: US 12,082,134 B2
(45) Date of Patent: Sep. 3, 2024

(54) FREQUENCY DOMAIN BEAM SWEEPING FOR SYNCHRONIZATION SIGNALS

(71) Applicant: QUALCOMM Incorporated, San Diego, CA (US)

(72) Inventors: Navid Abedini, Basking Ridge, NJ (US); Junyi Li, Fairless Hills, PA (US); Juergen Cezanne, Ocean Township, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/450,404

(22) Filed: Oct. 8, 2021

(65) Prior Publication Data
US 2023/0115394 A1 Apr. 13, 2023

(51) Int. Cl.
*H04W 16/28* (2009.01)
*H04W 56/00* (2009.01)
*H04W 72/0453* (2023.01)
*H04W 74/0833* (2024.01)

(52) U.S. Cl.
CPC ......... *H04W 56/001* (2013.01); *H04W 16/28* (2013.01); *H04W 72/0453* (2013.01); *H04W 74/0841* (2013.01)

(58) Field of Classification Search
CPC ............... H04W 56/001; H04W 16/28; H04W 72/0453; H04W 48/08; H04B 7/15
See application file for complete search history.

(56) References Cited

U.S. PATENT DOCUMENTS

| | | | |
|---|---|---|---|
| 2019/0380099 A1* | 12/2019 | Hakola | H04B 7/0695 |
| 2020/0100295 A1* | 3/2020 | Pao | H04L 5/0082 |
| 2020/0252891 A1* | 8/2020 | Chendamarai Kannan | H04W 74/0808 |
| 2020/0403689 A1* | 12/2020 | Rofougaran | H04W 52/245 |
| 2021/0067237 A1* | 3/2021 | Sampath | H04W 56/005 |
| 2021/0160801 A1* | 5/2021 | Lim | H04L 7/0087 |
| 2021/0298069 A1* | 9/2021 | Abedini | H04W 56/001 |
| 2022/0053433 A1* | 2/2022 | Abedini | H04B 7/15528 |
| 2022/0174509 A1* | 6/2022 | Noh | H04W 72/51 |
| 2022/0240305 A1* | 7/2022 | Black | H04W 72/046 |
| 2022/0368436 A1* | 11/2022 | Abedini | H04B 7/0619 |
| 2022/0417880 A1* | 12/2022 | Priyanto | H04W 74/0833 |
| 2023/0036639 A1* | 2/2023 | Hakola | H04B 7/088 |

(Continued)

OTHER PUBLICATIONS

Liu, Y. et al., "True Time Delay MillimeterWave Beam Steering with Integrated Optical Beamforming Network," 2019, 2 pages.

*Primary Examiner* — Gary Mui
(74) *Attorney, Agent, or Firm* — Harrity & Harrity LLP/Qualcomm Incorporated

(57) ABSTRACT

Various aspects of the present disclosure generally relate to wireless communication. In some aspects, a base station may transmit at least a first synchronization signal block (SSB) over a first sub-band in a first spatial direction and a second SSB over a second sub-band in a second spatial direction, wherein the at least the first SSB and the second SSB are transmitted at a same time and wherein the at least the first SSB and the second SSB comprise a set of SSBs, the at least first sub-band and the second sub-band comprise a first set of sub-bands, and the at least first spatial direction and the second spatial direction comprise a first set of spatial directions. Numerous other aspects are described.

30 Claims, 16 Drawing Sheets

1100 ⟶

1110 — Generate a signal for a set of synchronization signal blocks (SSBs) using a frequency domain beam sweeping technique to generate the signal over a first set of spatial directions, wherein the signal is associated with a frequency domain resource allocation that includes a first set of sub-bands and each sub-band is associated with a spatial direction, of the first set of spatial directions, and an SSB of the set of SSBs 1120 — Transmit at least a first SSB over a first sub-band in a first spatial direction and a second SSB over a second sub-band in a second spatial direction, wherein the at least the first SSB and the second SSB are transmitted at a same time and wherein the at least the first SSB and the second SSB comprise the set of SSBs, the at least first sub-band and the second sub-band comprise the first set of sub-bands, and the at least first spatial direction and the second spatial direction comprise the first set of spatial directions

(56) References Cited

U.S. PATENT DOCUMENTS

| | | | |
|---|---|---|---|
| 2023/0059284 A1* | 2/2023 | Hakola | H04W 72/046 |
| 2023/0105291 A1* | 4/2023 | Abedini | H04W 16/28 |
| | | | 370/329 |
| 2023/0171675 A1* | 6/2023 | Lee | H04W 48/08 |
| | | | 370/315 |

* cited by examiner

US 12,082,134 B2

FREQUENCY DOMAIN BEAM SWEEPING FOR SYNCHRONIZATION SIGNALS

FIELD OF THE DISCLOSURE

Aspects of the present disclosure generally relate to wireless communication and to techniques and apparatuses for frequency domain beam sweeping for synchronization signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even a global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a base station for wireless communication includes a memory, a transceiver, and one or more processors, coupled to the memory and the transceiver, configured to: transmit, via the transceiver, at least a first synchronization signal block (SSB) over a first sub-band in a first spatial direction and a second SSB over a second sub-band in a second spatial direction, wherein the at least the first SSB and the second SSB are transmitted at a same time and wherein the at least the first SSB and the second SSB comprise a set of SSBs, the at least first sub-band and the second sub-band comprise a first set of sub-bands, and the at least first spatial direction and the second spatial direction comprise a first set of spatial directions.

In some aspects, a user equipment (UE) for wireless communication includes a memory, a transceiver, and one or more processors, coupled to the memory and the transceiver, configured to: receive, via the transceiver, an SSB associated with a frequency domain beam sweeping technique; and decode the signal to identify a spatial direction associated with the SSB based at least in part on a frequency domain resource allocation associated with the SSB.

In some aspects, a repeater device for wireless communication includes a memory, a transceiver, and one or more processors, coupled to the memory and the transceiver, configured to: receive, via the transceiver, one or more SSBs, associated with a frequency domain beam sweeping technique, to be forwarded by the repeater device; and transmit, via the transceiver, a set of SSBs associated with the one or more received SSBs, wherein SSBs included in the set of SSBs are transmitted using different frequency domain resources and are transmitted in different spatial directions.

In some aspects, a method of wireless communication performed by a base station includes transmitting, via a transceiver, at least a first SSB over a first sub-band in a first spatial direction and a second SSB over a second sub-band in a second spatial direction, wherein the at least the first SSB and the second SSB are transmitted at a same time and wherein the at least the first SSB and the second SSB comprise a set of SSBs, the at least first sub-band and the second sub-band comprise a first set of sub-bands, and the at least first spatial direction and the second spatial direction comprise a first set of spatial directions.

In some aspects, a method of wireless communication performed by a UE includes receiving, via a transceiver, an SSB associated with a frequency domain beam sweeping technique; and decoding the signal to identify a spatial direction associated with the SSB based at least in part on a frequency domain resource allocation associated with the SSB.

In some aspects, a method of wireless communication performed by a repeater device includes receiving, via a transceiver, one or more SSBs, associated with a frequency domain beam sweeping technique, to be forwarded by the repeater device; and transmitting, via the transceiver, a set of SSBs associated with the one or more received SSBs, wherein SSBs included in the set of SSBs are transmitted using different frequency domain resources and are transmitted in different spatial directions.

In some aspects, a non-transitory computer-readable medium storing a set of instructions for wireless communication includes one or more instructions that, when executed by one or more processors of a base station, cause the base station to: transmit, via a transceiver, at least a first SSB over a first sub-band in a first spatial direction and a second SSB over a second sub-band in a second spatial direction, wherein the at least the first SSB and the second SSB are transmitted at a same time and wherein the at least the first SSB and the second SSB comprise a set of SSBs, the at least first sub-band and the second sub-band comprise a first set of sub-bands, and the at least first spatial direction and the second spatial direction comprise a first set of spatial directions.

In some aspects, a non-transitory computer-readable medium storing a set of instructions for wireless communication includes one or more instructions that, when executed by one or more processors of a UE, cause the UE to: receive, via a transceiver, an SSB associated with a frequency domain beam sweeping technique; and decode the signal to identify a spatial direction associated with the SSB based at least in part on a frequency domain resource allocation associated with the SSB.

In some aspects, a non-transitory computer-readable medium storing a set of instructions for wireless communication includes one or more instructions that, when executed by one or more processors of a repeater device, cause the repeater device to: receive, via a transceiver, one or more SSBs, associated with a frequency domain beam sweeping technique, to be forwarded by the repeater device; and transmit a set of SSBs associated with the one or more received SSBs, wherein SSBs included in the set of SSBs are transmitted using different frequency domain resources and are transmitted in different spatial directions.

In some aspects, an apparatus for wireless communication includes means for transmitting, via a transceiver, at least a first SSB over a first sub-band in a first spatial direction and a second SSB over a second sub-band in a second spatial direction, wherein the at least the first SSB and the second SSB are transmitted at a same time and wherein the at least the first SSB and the second SSB comprise a set of SSBs, the at least first sub-band and the second sub-band comprise a first set of sub-bands, and the at least first spatial direction and the second spatial direction comprise a first set of spatial directions.

In some aspects, an apparatus for wireless communication includes means for receiving, via a transceiver, an SSB associated with a frequency domain beam sweeping technique; and means for decoding the signal to identify a spatial direction associated with the SSB based at least in part on a frequency domain resource allocation associated with the SSB.

In some aspects, an apparatus for wireless communication includes means for receiving, via a transceiver, one or more SSBs, associated with a frequency domain beam sweeping technique, to be forwarded by the repeater device; and means for transmitting, via the transceiver, a set of SSBs associated with the one or more received SSBs, wherein SSBs included in the set of SSBs are transmitted using different frequency domain resources and are transmitted in different spatial directions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
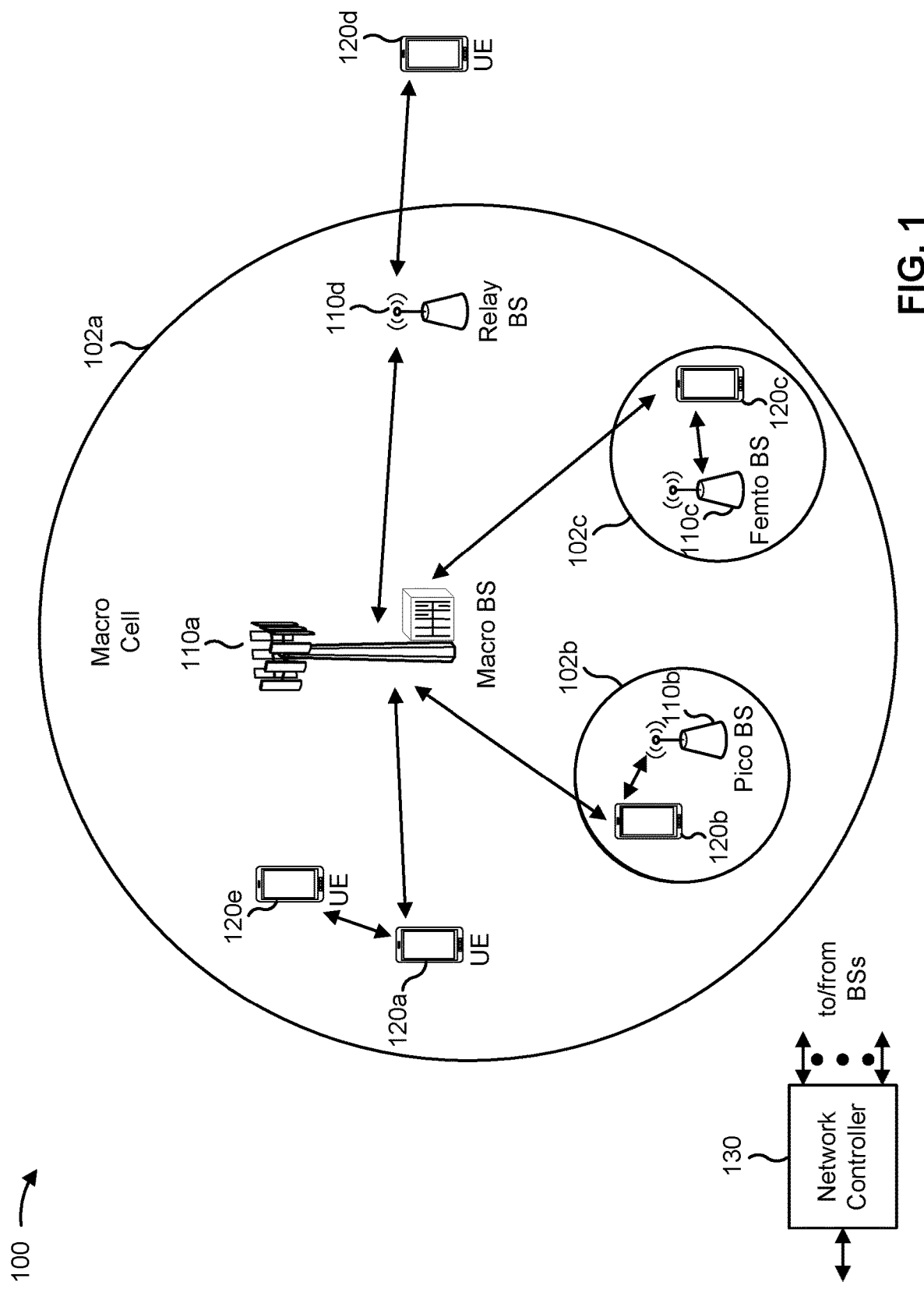
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
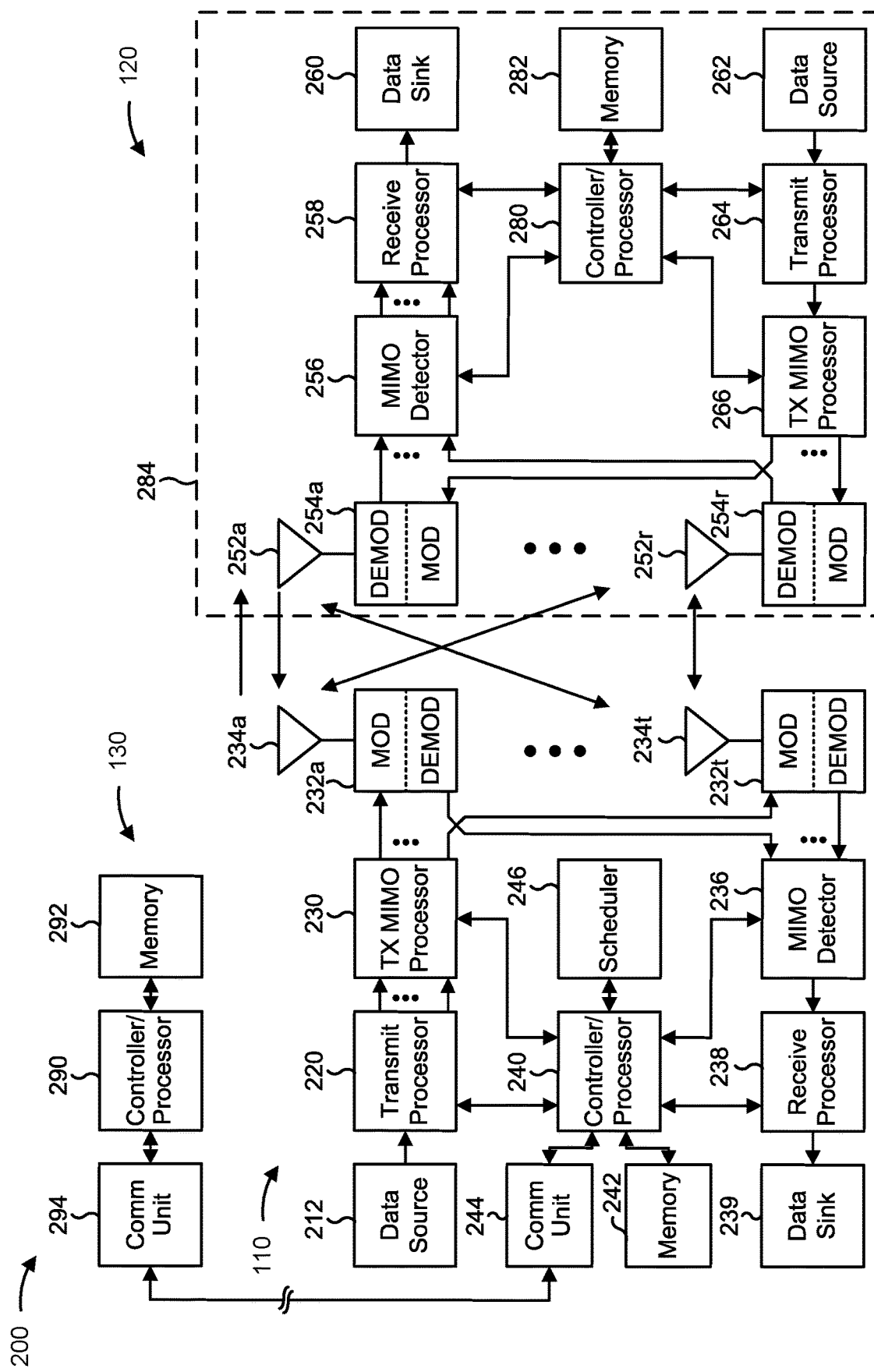
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-13).

Controller/processor 240 of base station 110, controller/processor 280 of UE 120, and/or any other component(s) of FIG. 2 may perform one or more techniques associated with frequency domain beam sweeping for synchronization signals, as described in more detail elsewhere herein. In some aspects, a repeater or a repeater device described herein is the base station 110, is included in the base station 110, or includes one or more components of the base station 110 shown in FIG. 2. In some aspects, a repeater or a repeater device described herein is the UE 120, is included in the UE 120, or includes one or more components of the UE 120 shown in FIG. 2.

Figure 11:
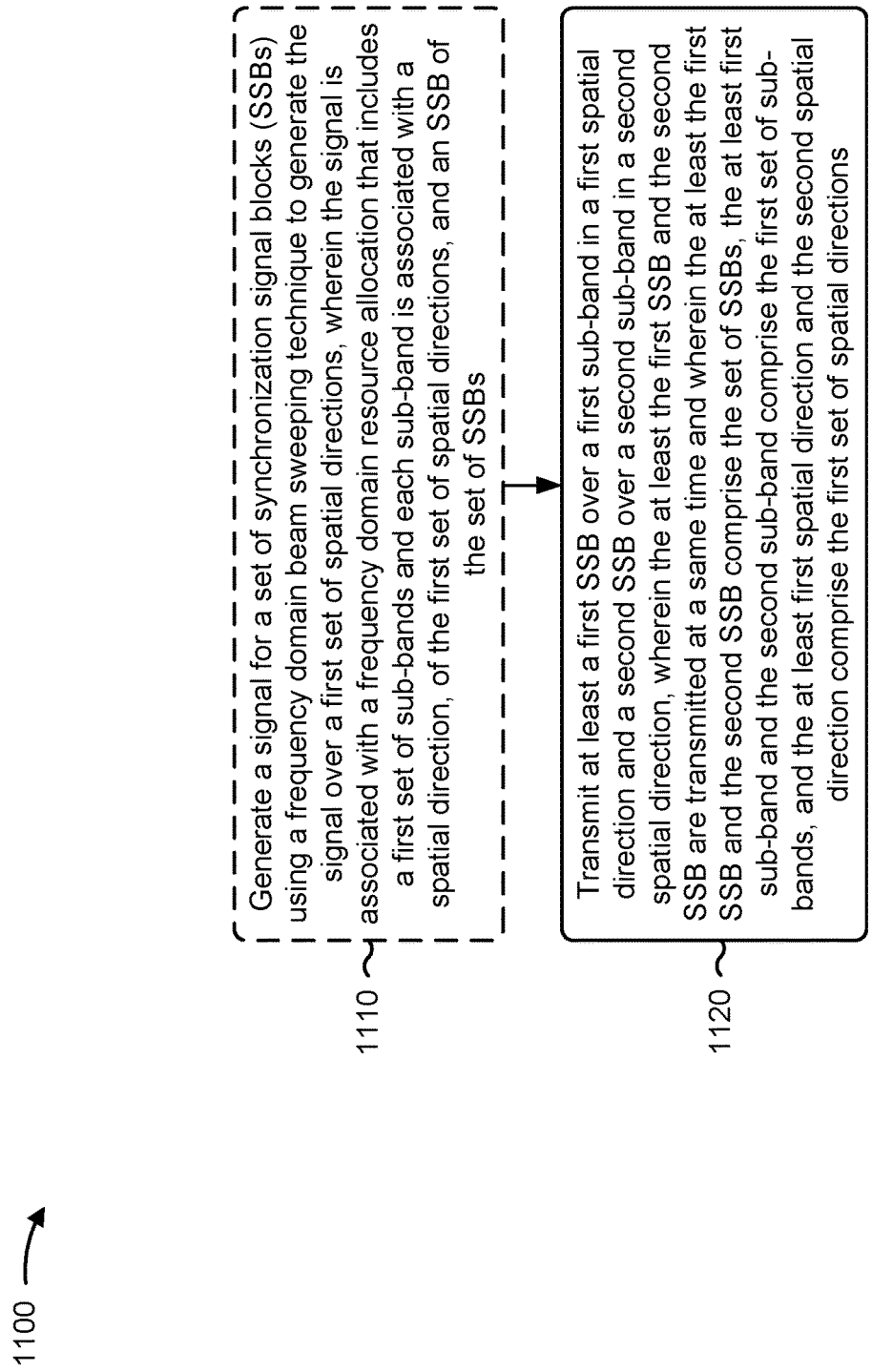
FIGS. 11-13 are diagrams illustrating example processes associated with frequency domain beam sweeping for synchronization signals, in accordance with the present disclosure.
Figure 12:
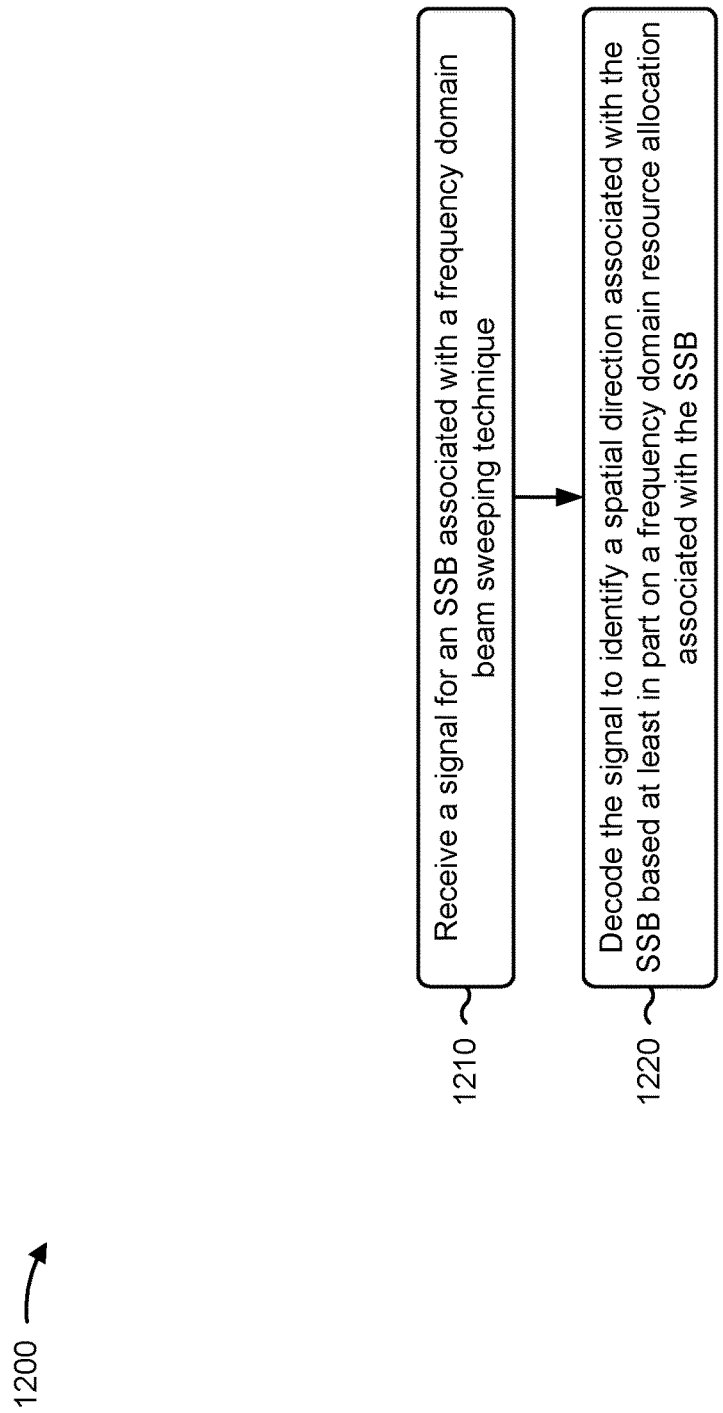
Figure 13:
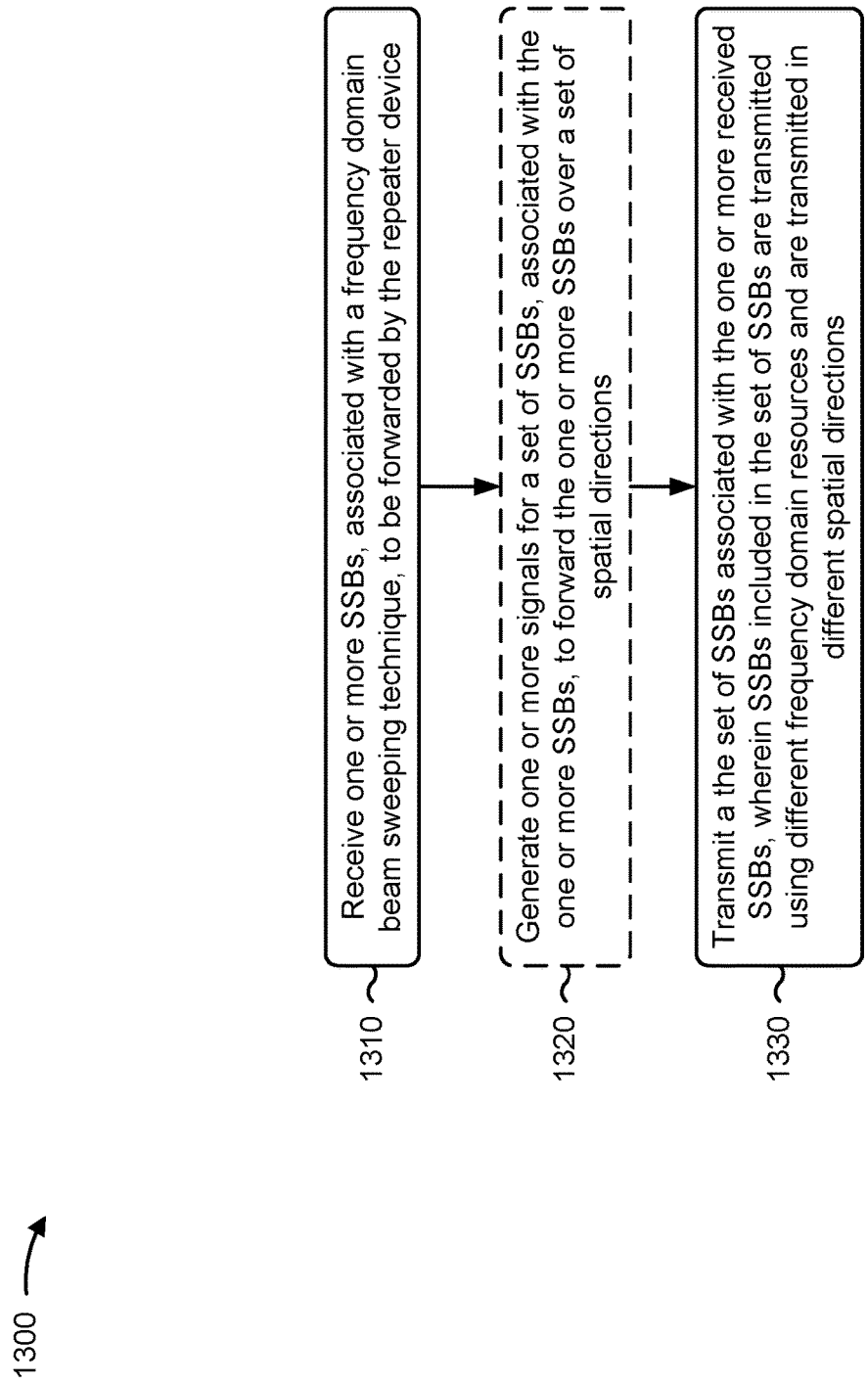

For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, the base station 110 includes means for transmitting at least a first synchronization signal block (SSB) over a first sub-band in a first spatial direction and a second SSB over a second sub-band in a second spatial direction, wherein the at least the first SSB and the second SSB are transmitted at a same time and wherein the at least the first SSB and the second SSB comprise a set of SSBs, the at least first sub-band and the second sub-band comprise a first set of sub-bands, and the at least first spatial direction and the second spatial direction comprise a first set of spatial directions (e.g., using the transceiver, controller/processor 240, transmit processor 220, TX MIMO processor 230, MOD 232, antenna 234, and/or memory 242). The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the UE 120 includes means for receiving an SSB associated with a frequency domain beam sweeping technique (e.g., using antenna 252, DEMOD 254, MIMO detector 256, receive processor 258, controller/processor 280, and/or memory 282); and/or means for decoding the SSB to identify a spatial direction associated with the SSB based at least in part on a frequency domain resource allocation associated with the SSB (e.g., using antenna 252, DEMOD 254, MIMO detector 256, receive processor 258, controller/processor 280, and/or memory 282). The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a repeater device includes means for receiving one or more SSBs, associated with a frequency domain beam sweeping technique, to be forwarded by the repeater device (e.g., using antenna 252, DEMOD 254, MIMO detector 256, receive processor 258, controller/processor 280, memory 282, antenna 234, DEMOD 232, MIMO detector 236, receive processor 238, controller/processor 240, and/or memory 242); and/or means for transmitting a set of SSBs associated with the one or more received SSBs, wherein SSBs included in the set of SSBs are transmitted using different frequency domain resources and are transmitted in different spatial directions (e.g., using controller/processor 280, transmit processor 264, TX MIMO processor 266, MOD 254, antenna 252, memory 282, controller/processor 240, transmit processor 220, TX MIMO processor 230, MOD 232, antenna 234, and/or memory 242). In some aspects, the means for the repeater device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the repeater device to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
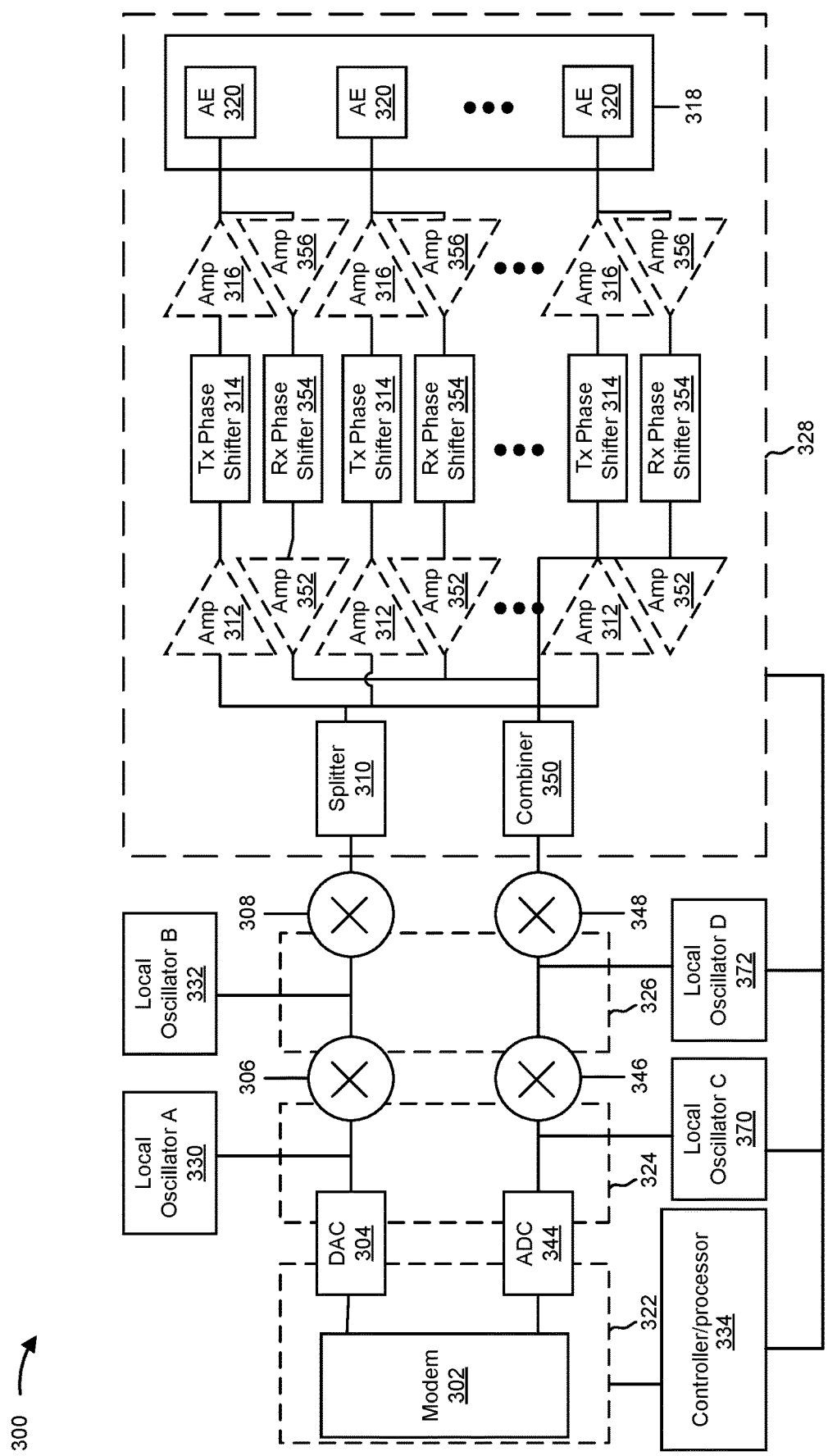
FIG. 3 is a diagram illustrating an example beamforming architecture that supports beamforming for millimeter wave communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 are input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
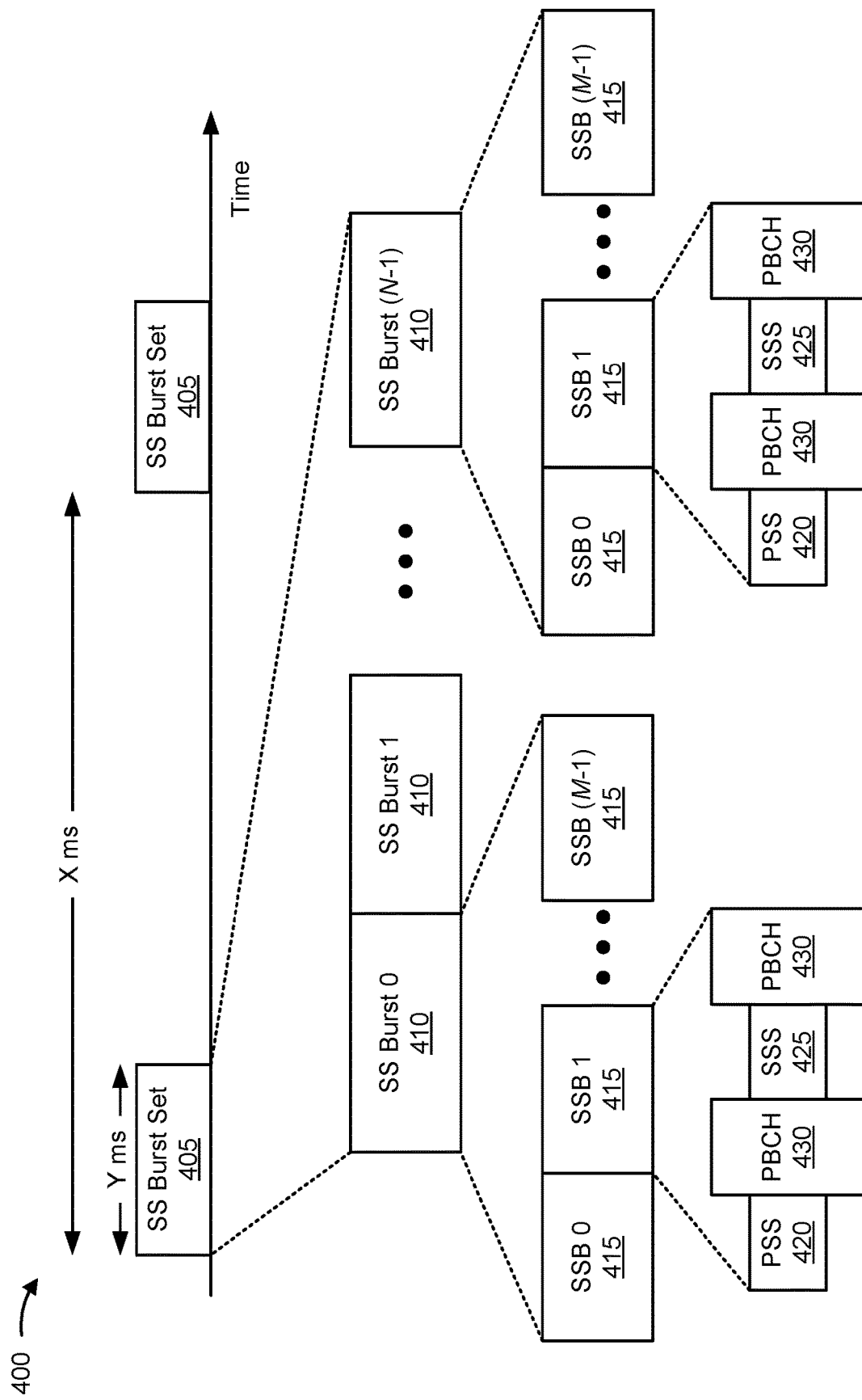
FIG. 4 is a diagram illustrating an example of a synchronization signal hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a primary synchronization signal (PSS) 420, a secondary synchronization signal (SSS) 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., a reference signal received power (RSRP) parameter) to a base station 110. The base station 110 and the UE 120 may use the one or more indicated SSBs 415 to select one or more beams to be used for communication between the base station 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

As described above, each SSB may be beamformed (e.g., analog beamformed, such as described above in connection with FIG. 3) such that the SSBs (e.g., SSB 0 through SSB M−1) are transmitted in different spatial directions. Therefore, when transmitting SSBs and/or SS bursts, a base station 110 may beam sweep (e.g., transmit using different beams for each SSB) across different beams in the time domain (as shown in FIG. 4).

As indicated above, FIG. 4 is provided as an example. Other examples may differ from what is described with regard to FIG. 4.

Figure 5:
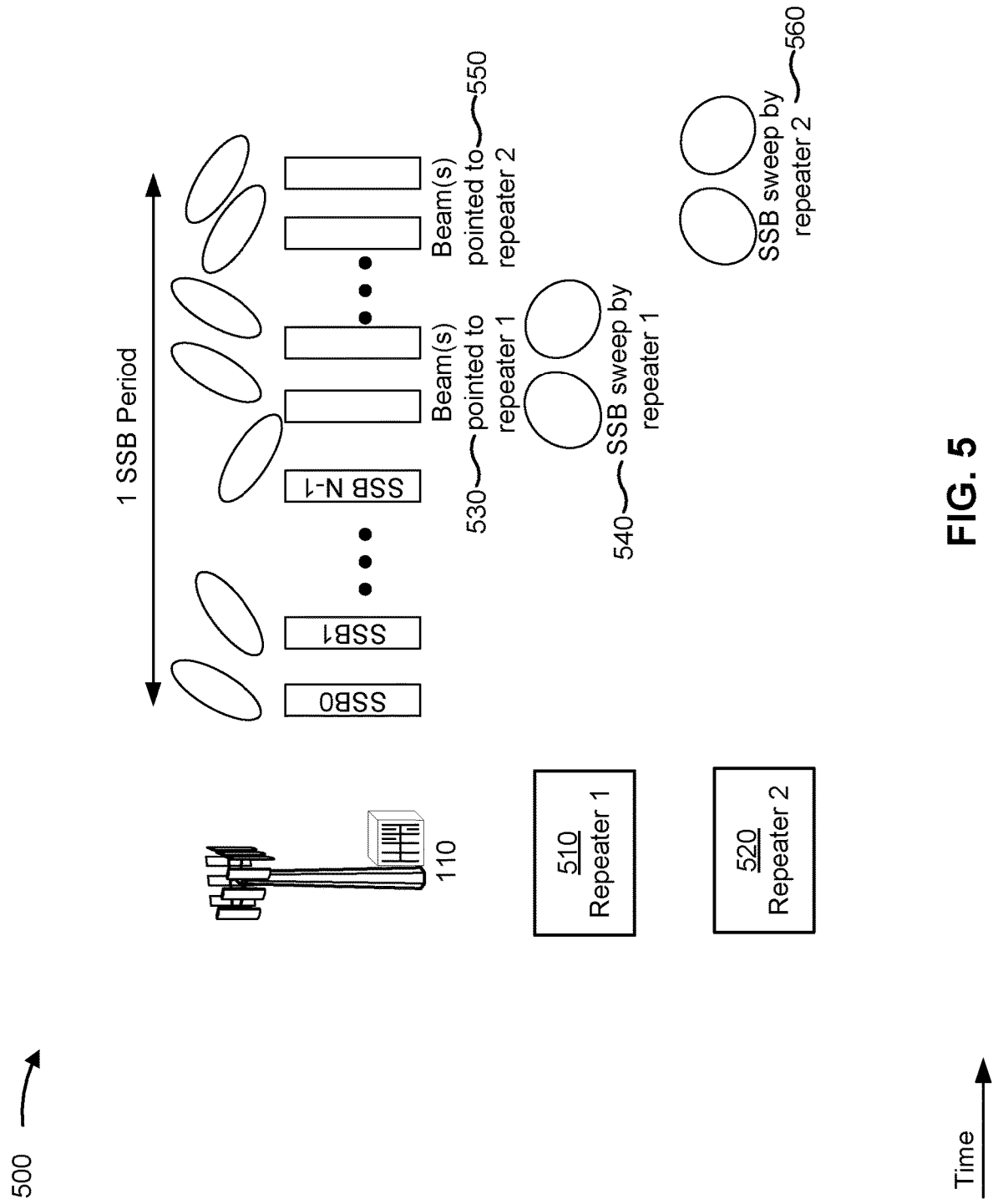
FIG. 5 is a diagram illustrating an example of synchronization signal transmission in a wireless network, in accordance with the present disclosure.

FIG. 5 is a diagram illustrating an example 500 of synchronization signal transmission in a wireless network, in accordance with the present disclosure. As shown in FIG. 5, a base station 110 may transmit synchronization signals (e.g., SSBs) in a wireless network, such as wireless network 100, in a similar manner as described in connection with FIG. 4.

For example, as shown in FIG. 5, the base station 110 may transmit a set of SSBs (e.g., 2, 4, 8, 16, 32, or 64 SSBs) using different beams. In other words, the base station 110 may transmit copies or repetitions of an SSB in different spatial directions to enable UEs (or other wireless communication devices) within a coverage area of the base station 110 to receive a copy of an SSB that is transmitted in a spatial direction associated with the UE for initial access with the base station 110. The base station 110 may transmit the set of SSBs in a time division multiplex (TDM) manner (e.g., transmitting one SSB signal at a time). Therefore, as the number of SSBs and/or the number of spatial transmit directions increases, a latency associated with beam sweeping through all SSBs and/or all spatial transmit directions increases. For example, transmitting SSBs in the TDM manner may increase acquisition latency for a UE that is required to wait for an SSB that is at the end of an SSB period, as shown in FIG. 5. Moreover, as more SSBs and/or more spatial transmit directions are added by the base station 110, the acquisition latency for the UE increases. As used herein, "spatial direction," "direction," and/or "beam" may be used interchangeably.

In some cases, as shown in FIG. 5, the base station 110 may transmit one or more SSBs to a repeater. For example, the base station 110 may communicate using a high operating frequency, such as a millimeter wave frequency. Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 110 that communicates using the sub-6 GHz radio waves. However, a millimeter wave may not be capable of penetrating the same wall (e.g., depending on a thickness of the wall, and/or a material from which the wall is constructed). Therefore, a repeater may be deployed in the wireless network to increase the coverage area of a base station 110, and/or to extend coverage to UEs 120 without line of sight to the base station 110 (e.g., due to an obstruction), among other examples. As used herein, "repeater" or "repeater device" may refer to a wireless communication device that is capable of receiving a signal, repeating or generated a repeated copy of the signal, and transmitting (e.g., forwarding) the repeated copy of the signal. A repeater may be a millimeter wave repeater, a Layer 1 repeater, a Layer 2 repeater, an analog repeater, and/or a digital repeater, among other examples.

In some cases, a repeater may perform directional communication by using beamforming to communicate with a base station 110 via a first beam (e.g., a backhaul beam over a backhaul link with the base station 110) and to communicate with a UE via a second beam (e.g., an access beam over an access link with the UE 120). For example, as shown in FIG. 5, and by reference number 530, the base station 110 may transmit one or more copies of an SSB to a repeater 510 (e.g., repeater 1). For example, the base station 110 may transmit (e.g., in a TDM manner) one or more copies of an SSB to the repeater 510 that are to be forwarded by the repeater 510. For example, as shown by reference number 540, the repeater 510 may transmit (e.g., forward) the one or more copies of the SSB over one or more spatial transmit directions associated with the repeater 510. In other words, the repeater 510 may transmit, in a TDM manner, one or more SSBs of the base station 110 using a set of beams to increase a coverage area and/or to increase initial access opportunities for a wireless network served by the base station 110.

Similarly, as shown by reference number 550, the base station 110 may transmit one or more copies of an SSB to a repeater 520 (e.g., repeater 2). For example, the base station 110 may transmit (e.g., in a TDM manner) one or more copies of an SSB to the repeater 520 that are to be forwarded by the repeater 520. For example, as shown by reference number 560, the repeater 520 may transmit (e.g., forward) the one or more copies of the SSB over one or more spatial transmit directions associated with the repeater 520. In other words, the repeater 520 may transmit, in a TDM manner, one or more SSBs of the base station 110 using a set of beams of the repeater 520. Therefore, the introduction of repeaters or similar devices for forwarding communications in a wireless network further increases a latency associated with beam sweeping through all SSBs of the base station 110. For example, a latency is introduced associated with the base station 110 transmitting SSBs in a TDM manner to the repeaters (e.g., shown by reference numbers 530 and 550) and additional latency is introduced associated with the repeaters forwarding the SSBs in a TDM manner (e.g., as shown by reference numbers 540 and 560).

As indicated above, FIG. 5 is provided as an example. Other examples may differ from what is described with regard to FIG. 5.

Figure 6:
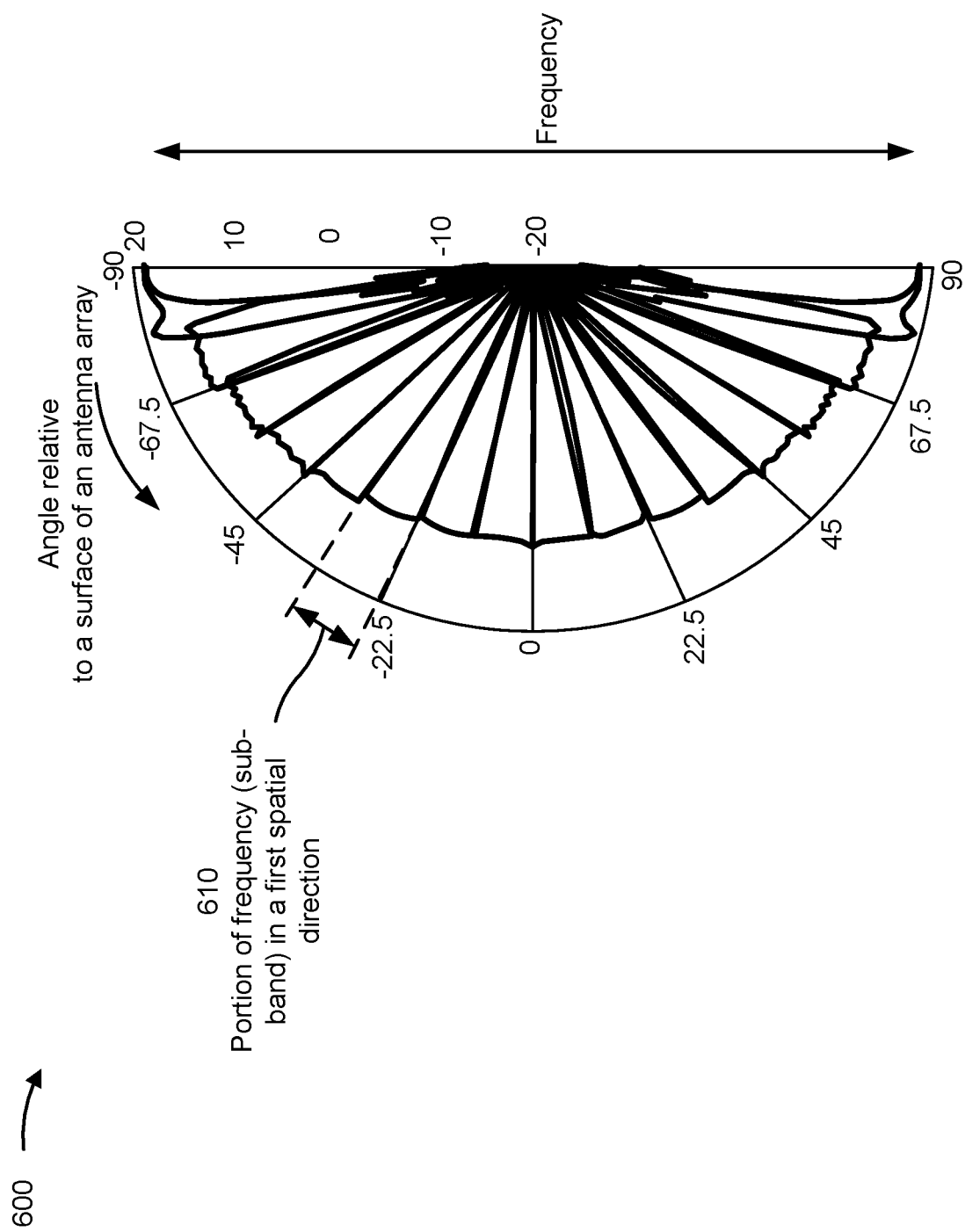
FIG. 6 is a diagram illustrating an example of signal generation using a frequency domain beam sweeping technique, in accordance with the present disclosure.

FIG. 6 is a diagram illustrating an example 600 of signal generation using a frequency domain beam sweeping technique, in accordance with the present disclosure. FIG. 6 depicts a signal (e.g., a wideband signal) generated by a wireless communication device (e.g., a base station 110 and/or a UE 120) using a frequency domain beam sweeping technique.

As described above, an analog beamforming antenna array (such as a beamforming array described above in connection with FIG. 3) may be used to generate beamformed signals. A beam may be generated by the analog beamforming array by applying different beamforming weights (e.g., different phase shift coefficients and/or different amplitudes) to different antenna elements of an antenna array. For example, analog beamforming may include the generation of a beam using multiple signals on different antenna elements of an antenna array, where one or more or all of the multiple signals are shifted in phase relative to each other. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array) can be dynamically controlled by modifying the beamforming weights (e.g., phase shifts or phase offsets) of the multiple signals relative to each other. As described above, analog beamforming may generate a single beam (e.g., may focus a signal in one spatial direction relative to the antenna array) at a time.

A frequency domain beam sweeping technique may enable a wireless communication device to generate a signal where different portions of a frequency domain allocation of the signal are associated with different spatial directions relative to a surface of an antenna array. Therefore, the wireless communication device may simultaneously transmit in different directions using different frequency domain allocations of a signal. As used herein, "frequency domain beam sweeping" or "frequency domain beam sweeping technique" may refer to the generation of a signal in which different frequency domain allocations of the signal are focused in different spatial directions (e.g., relative to an antenna array that is used to generate and/or transmit the signal) at the same time. For example, as shown in FIG. 6, a wideband signal generated using a frequency domain beam sweeping technique may focus different portions of a frequency domain allocation of the signal in different directions relative to a surface of an antenna array.

In some cases, a frequency domain beam sweeping technique may include a true time delay beamforming technique, among other examples. A true time delay beamforming technique (e.g., transmitting using a true time delay analog antenna array) may enable the wireless communication device to add a time delay (e.g., a time delay increment) to the beamforming weights used in connection with an analog beamforming architecture, such as the beamforming architecture described above in connection with FIG. 3. For example, a time delay value may be introduced to each antenna element of the antenna array such that outgoing signals from the antenna elements are shifted in time relative to each other (e.g., in addition to, or instead of, a phase shift as described above). For example, a different time delay value may be applied to each antenna element of the antenna array. For example, assume a wideband (e.g., spanning multiple tones) signal S that is to be transmitted by the array of antenna elements, where each antenna element i multiplies signal S by its respective beamforming weight, $w_i$, as mentioned above. In this true-time-delay architecture, each antenna element i would, in addition to multiplying signal S by its respective beamforming weight, apply a time delay, $d_i$. In one mathematical representation, each antenna element i would transmit signal $Y_i$, where signal $Y_i(t)=w_i *S(t-d_i)$. A fixed time delay or time shift, $d_i$, across the antenna elements in time domain can result in a frequency dependent phase shift in the frequency domain. As such, the time delay, $d_i$, applied to each antenna element can be understood as a different frequency domain phase offset value being introduced to each tone of signal S. This phase offset can result in each tone being transmitted in a different direction. Thus, a direction (relative to the surface of the antenna array) of the signal may be different for different portions of the bandwidth of the signal. This enables the wireless communication device to use an analog beamforming architecture to generate a signal in which a direction of the signal may be different for different portions of the bandwidth of the signal at the same time. While the signal S has been described above as being multiplied by beamforming weights, it is understood that such a multiplication in mathematical terms may be implemented in hardware in an antenna array, or circuitry associated with an antenna array, using different components such as phase shifters, power amplifiers, and/or the like.

For example, as shown by reference number 610, a first portion of the frequency (e.g., a sub-band) of the signal is directed in a first spatial direction (e.g., approximately −22.5 degrees to −33.75 degrees relative to the surface of the antenna array as shown in FIG. 6). For example, if a receiver device is located in the first spatial direction relative to the antenna array, then the receiver device may be enabled to receive the signal using the first portion of the frequency of the signal. In other words, if the receiver device (that is located in the first spatial direction relative to the antenna array) attempts to receive the signal using a frequency that is outside of the first portion of the frequency, then the receiver device may detect or experience poor channel conditions (e.g., a low RSRP and/or a low RSRQ). However, if the receiver device (that is located in the first spatial direction relative to the antenna array) attempts to receive the signal using the first portion of the frequency, then the receiver device may detect or experience improved channel conditions (relative to channel conditions using a frequency that is outside of the first portion of the frequency).

As indicated above, the true time delay beamforming technique is provided as an example and other techniques or beamforming methods may be used to produce a similar effect. Therefore, as indicated above, "frequency domain beam sweeping" or "frequency domain beam sweeping technique" may refer to the generation of a signal in which different frequency domain allocations of the signal (e.g., different sub-bands and/or different portions of a bandwidth of the signal) are focused in different spatial directions (e.g., relative to an antenna array that is used to generate and/or transmit the signal) at the same time.

As described above, synchronization signals, such as SSBs, may be transmitted by a base station 110 using an analog beamforming architecture (e.g., in a TDM manner, as described above). Transmitting SSBs in the TDM manner may increase acquisition latency for a UE 120 that is required to wait for an SSB that is at the end of an SSB period, as shown in FIG. 5. Moreover, as more SSBs and/or more spatial transmit directions are added by the base station 110, the acquisition latency for the UE 120 increases. Furthermore, the introduction of repeaters or similar devices for forwarding communications in a wireless network further increases a latency associated with beam sweeping through all SSBs of the base station 110, as described above.

Some techniques and apparatuses described herein enable frequency domain beam sweeping for synchronization signals, such as SSBs. For example, a base station 110 may generate and transmit a set of SSBs using a frequency domain beam sweeping technique, such as a true time delay analog beamforming technique. The base station 110 may be enabled to transmit a set of copies of an SSB over a set of spatial directions at the same time (e.g., using different frequency domain allocations or sub-bands of a signal). Similarly, a repeater may be enabled to transmit a set of SSBs using a frequency domain beam sweeping technique. In some aspects, the base station 110 may use a two-dimensional beam sweeping pattern (e.g., in the time domain and the frequency domain) to transmit a set of SSBs to minimize a channel acquisition time for UEs 120 within a coverage area of the base station 110.

As a result, a latency associated with transmitting a set of SSBs (e.g., a latency associated with beam sweeping through a set of SSBs in a TDM manner) may be significantly reduced. Moreover, initial access latency caused by the introduction of, or deployment of, repeaters in a wireless network may be reduced by using a frequency domain beam sweeping technique to transmit SSBs. Therefore, a channel acquisition time (e.g., an amount of time required for the UE 120 to access a channel) for UEs 120 located within a coverage area of the base station 110 (and/or a repeater associated with the base station 110) may be reduced. This improves communication performance and channel access for UEs 120 (or other wireless communication devices) located within a coverage area of the base station 110.

Figure 7:
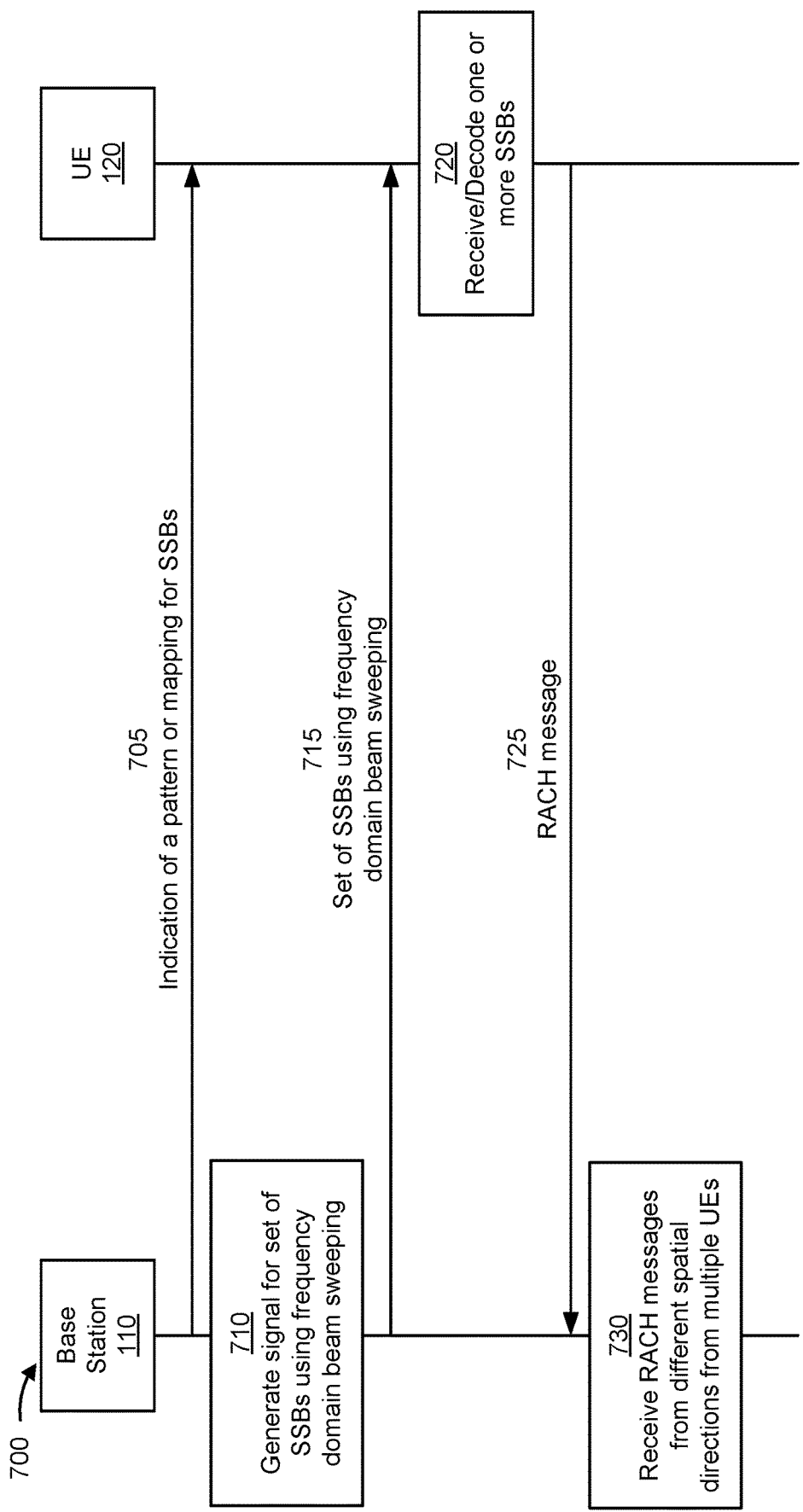
FIGS. 7 and 8 are diagrams illustrating examples associated with frequency domain beam sweeping for synchronization signals, in accordance with the present disclosure.

FIG. 7 is a diagram illustrating an example 700 associated with frequency domain beam sweeping for synchronization signals, in accordance with the present disclosure. As shown in FIG. 7, a base station 110 and a UE 120 may communicate with one another in a wireless network, such as wireless network 100.

As described above, the base station 110 may use a frequency domain beam sweeping technique to transmit synchronization signals, such as SSBs. For example, the base station 110 may transmit a set of SSBs, with each SSB being transmitted using different frequency domain resources (e.g., using different sub-bands of a bandwidth of a signal) and in different spatial directions at the same time. For example, the base station 110 may have K directions to transmit in. The base station 110 may be enabled to transmit K copies of an SSB (e.g., one copy of an SSB in each of the K directions) in different sub-bands of a signal at a same time. Therefore, a first SSB may be associated with a first sub-band (e.g., a frequency domain resource allocation) of a signal and a second SSB may be associated with a second sub-band of the signal. In other words, the base station 110 may be enabled to transmit SSBs in a frequency division multiplex (FDM) manner (e.g., rather than solely a TDM manner) while still maintaining the analog beamforming architecture (e.g., as described above in connection with FIG. 3).

For example, as described above, using a frequency domain beam sweeping technique, the base station 110 may be enabled to generate a signal in which different sub-bands of the signal are focused in different spatial directions. The base station 110 may allocate (e.g., in an FDM manner) a copy of an SSB to a sub-band that is associated with a spatial direction. In this way, the base station 110 may allocate or map SSBs to different sub-bands such that, when the signal is generated using the frequency domain beam sweeping technique, the different SSBs are transmitted in different spatial directions at the same time.

In some aspects, the base station 110 may communicate with one or more other base stations 110 to coordinate a set of spatial directions and/or a set of sub-bands used by the base station 110 to transmit SSBs. For example, in a wireless network, base stations 110 may have overlapping coverage areas (e.g., overlapping cells). Therefore, if the base station 110 transmits a signal towards an area that overlaps with a coverage area of a different base station 110, the signal may cause interference with another signal transmitted by the different base station 110. Therefore, the base station 110 may communicate (e.g., transmit and/or receive signals) with one or more other base stations 110 to ensure that the base station 110 is not using a sub-band in a spatial direction that may introduce interference. For example, for a spatial direction that is associated with an overlapping coverage area with a second base station 110, the base station 110 may communicate with the second base station 110 to ensure that the base station 110 is not using a same sub-band (e.g., a same frequency domain resource allocation) to transmit SSBs in the spatial direction that is associated with the overlapping coverage area as a sub-band (e.g., a same frequency domain resource allocation) used by the second base station 110 to transmit SSBs in the spatial direction that is associated with the overlapping coverage area.

In some aspects, as shown by reference number 705, the base station 110 may transmit an indication of a pattern or mapping for SSBs to be transmitted by the base station 110. For example, the base station 110 may transmit an indication of a time domain mapping for a set of SSBs, and/or a frequency domain mapping for the set of SSBs, among other examples. For example, the base station 110 may transmit the indication of the pattern or the mapping for the SSBs when a two-dimensional beam sweeping pattern is used for SSBs, as described in more detail below in connection with FIGS. 9 and 10.

For example, the base station 110 may transmit the indication using information elements (IEs) indicating actually transmitted SSBs for each sub-band included in a set of sub-bands used by the base station 110 (e.g., an actually transmitted SSB IE as defined, or otherwise fixed, by a wireless communication standard, such as the 3GPP). For example, the base station 110 may transmit an indication of SSBs to be transmitted in a sub-band over time using an actually transmitted SSB IE for the sub-band. The base station 110 may transmit an actually transmitted SSB IE for each sub-band associated with the set of SSBs to be transmitted by the base station 110. In some aspects, the base station 110 may transmit an indication of the set of sub-bands and a frequency domain resource allocation associated with each sub-band included in the set of sub-bands. For example, the base station 110 may transmit an indication of a resource block (RB) (e.g., a starting RB and/or an ending RB) for a sub-band and a number of RBs included in the sub-band. In some aspects, the base station 110 may transmit the indication using a system information block (SIB) message, a radio resource control message, and/or an F1-application protocol message, among other examples.

In some aspects, the base station 110 may transmit an indication of quasi co-location (QCL) relationship information for SSBs included in the set of SSBs that are transmitted in the same spatial direction. For example, using a two-dimensional beam sweeping pattern, the base station 110 may transmit different SSBs in the same spatial direction over time, as described in more detail below. The base station 110 may transmit QCL relation information for SSBs that are to be transmitted in the same spatial direction.

In some aspects, the two dimensional beam sweeping pattern may follow a cyclic shift rule. For example, a frequency domain beam sweeping pattern and/or a time domain beam sweeping pattern may be cyclic shifted over time. The base station 110 may transmit, to the UE 120, an indication of a cyclic shift pattern associated with the time domain beam sweep pattern and/or the frequency domain beam sweep pattern for the set of SSBs. For example, the base station 110 may indicate the cyclic shift, such as an amount of the cyclic shift (e.g., a common relative cyclic shift value or an absolute cyclic shift value for each sub-band and/or for each time domain block). In some aspects, the base station 110 may indicate a mapping rule for mapping the set of SSBs. For example, the SSBs may be mapped first in the frequency domain and second in the time domain. The base station 110 may transmit, to the UE 120, an indication that the set of SSBs is to be mapped first in the frequency domain and second in the time domain.

As shown by reference number 710, the base station 110 may generate a signal for a set of SSBs using the frequency domain beam sweeping technique. For example, the base station 110 may generate the signal using a true time domain beamforming technique or another technique to generate a signal in which different frequency domain allocations of the signal (e.g., different sub-bands and/or different portions of a bandwidth of the signal) are focused in different spatial directions at the same time. The base station 110 may map a copy of an SSB to each sub-band (e.g., that is associated with a spatial direction) such that the set of SSBs is mapped to a set of spatial directions to be transmitted in at the same time. For example, the signal generated by the base station 110 may be associated with a frequency domain resource allocation that includes a set of sub-bands and each sub-band may be associated with a spatial direction and an SSB of the set of SSBs.

As shown by reference number 715, the base station 110 may transmit the set of SSBs using the frequency domain beam sweeping technique. For example, the base station 110 may transmit the set of SSBs over a set of spatial directions (e.g., a first set of spatial directions) at the same time. Each SSB may be associated with a different spatial direction and a different sub-band of the signal. In other words, the base station 110 may transmit (e.g., via a transceiver) at least a first SSB over a first sub-band in a first spatial direction and a second SSB over a second sub-band in a second spatial direction. For example, the first SSB and the second SSB may transmitted at the same time. The first SSB and the second SSB may be included in a set of SSBs. The first sub-band and the second sub-band may be included a set of sub-bands associated with the signal (e.g., a first set of sub-bands). The first spatial direction and the second spatial direction may be included in the set of spatial directions (e.g., a first set of spatial directions).

For example, the base station 110 may transmit a first SSB, of the set of SSBs, using a first sub-band of the signal and in a first spatial direction. The base station 110 may transmit a second SSB, of the set of SSBs, using a second sub-band of the signal and in a second spatial direction. The second SSB may be transmitted at a same time as a transmission time of the first SSB (e.g., the base station 110 may transmit a signal that spans or is directed in a set of spatial directions at the same time).

As shown by reference number 720, the UE 120 may receive an SSB from the set of SSBs transmitted by the base station 110. For example, the UE 120 may use a receiver (e.g., a wideband receiver) to monitor for SSBs (or other signals) from the base station 110. The UE 120 may detect an SSB that is transmitted by the base station 110. For example, the UE 120 may detect a frequency or a sub-band in which the SSB is received (e.g., using a wideband receiver). In some aspects, the UE 120 may detect a sub-band or frequency range in which the SSB is received with a quality (e.g., an RSRQ) or an energy (e.g., an RSRP) that satisfies a threshold.

The UE 120 may decode the signal associated with the SSB to identify a spatial direction associated with the SSB. For example, the UE 120 may identify the spatial direction (e.g., the beam) associated with the SSB based at least in part on a frequency domain resource allocation (e.g., a sub-band or frequency range) in which the SSB is received, as described above. For example, the UE 120 may determine the spatial direction associated with the SSB based at least in part on an index of a sub-band in which the SSB is detected by the UE 120. For example, the UE 120 may detect or identify an index associated with the frequency domain resource allocation (e.g., the sub-band) associated with the SSB and may identify the spatial direction associated with the SSB based at least in part the index associated with the frequency domain resource allocation.

In some aspects, as shown by reference number 725, the UE 120 may transmit a random access channel (RACH) message in response to receiving and/or decoding the SSB, as described above. For example, the UE 120 may transmit an initial message of a RACH procedure (e.g., a msg A of a two-step RACH procedure or a msg 1 of a four-step RACH procedure) based at least in part on receiving and/or decoding the SSB. In some aspects, the base station 110 may transmit the RACH message using a transmit frequency domain resource allocation that is based at least in part on the frequency domain resource allocation associated with the SSB. For example, the UE 120 may transmit the RACH message using the sub-band that is associated with the SSB. In some aspects, the UE 120 may transmit the RACH message in a spatial direction (e.g., using a beam) associated with the SSB.

As shown by reference number 730, the base station 110 may receive RACH messages using a frequency domain beam sweeping antenna array to enable the base station 110 to receive RACH messages from different spatial directions (and/or from multiple UEs 120) at the same time. For example, RACH messages from different UEs 120 (located in different spatial directions from the base station 110) may be frequency division multiplexed such that the base station 110 is enabled to receive the RACH messages from different spatial directions at the same time. For example, as described above, each UE 120 may use a sub-band (e.g., a frequency domain resource allocation) for a RACH message that corresponds to a sub-band of an SSB detected by the UE 120. Therefore, the spatial direction and the sub-band of the RACH message may be the same as the spatial direction and the sub-band of the corresponding SSB.

As a result, a latency associated with transmitting a set of SSBs (e.g., a latency associated with beam sweeping through a set of SSBs in a TDM manner) may be significantly reduced because the base station 110 is enabled to transmit multiple SSBs in different directions at the same time. Therefore, a channel acquisition time (e.g., an amount of time required for the UE 120 to access a channel) may be reduced. This improves communication performance and channel access for the UE 120 (or other wireless communication devices) located within a coverage area of the base station 110.

As indicated above, FIG. 7 is provided as an example. Other examples may differ from what is described with respect to FIG. 7.

Figure 8:
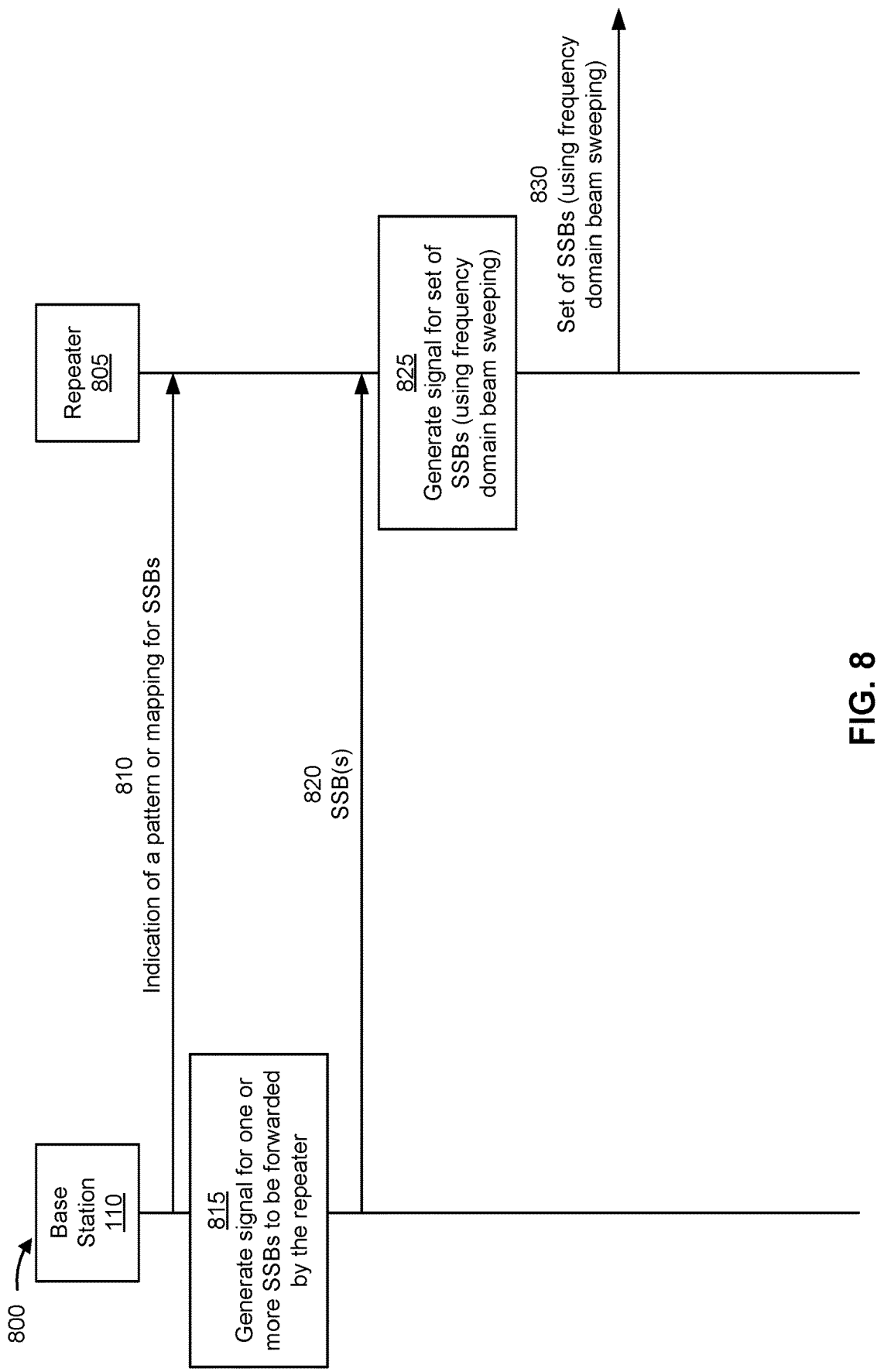

FIG. 8 is a diagram illustrating an example 800 associated with frequency domain beam sweeping for synchronization signals, in accordance with the present disclosure. As shown in FIG. 8, a base station 110 and a repeater 805 may communicate with one another in a wireless network, such as wireless network 100. For example, the repeater 805 may be deployed in the wireless network to increase the coverage area of a base station 110, and/or to extend coverage to UEs 120 without line of sight to the base station 110 (e.g., due to an obstruction), among other examples.

For example, the repeater 805 may be associated with a set of spatial directions (e.g., a set of beams) over which the repeater 805 is to forward communications (e.g., SSBs) received from the base station 110. In some aspects, as shown by reference number 810, the base station 110 may transmit an indication of a pattern or mapping for SSBs to be transmitted by the base station 110 (and/or to be forwarded by the repeater 805). For example, the base station 110 may transmit an indication of a time domain mapping for a set of SSBs, and/or a frequency domain mapping for the set of SSBs, among other examples. For example, the base station 110 may transmit the indication of the pattern or the mapping for the SSBs when a two-dimensional beam sweeping pattern is used for SSBs, as described in more detail below in connection with FIGS. 9 and 10. The indication of the pattern or mapping for the SSBs may indicate which SSBs are to be forwarded by the repeater 805.

For example, in some aspects, the repeater 805 may not support the frequency domain beam sweeping technique described above. Therefore, the base station 110 may indicate a time domain resource allocation and/or a frequency domain resource allocation of an SSB to be received and transmitted (e.g., forwarded) by the repeater 805. For example, the base station 110 may transmit an indication of a time domain resource allocation and/or a frequency domain resource allocation of an SSB when a two-dimensional beam sweeping pattern is used for SSBs, as described in more detail below in connection with FIGS. 9 and 10. In some aspects, the base station 110 may transmit, to the repeater 805, an indication of a sub-band index of a sub-band associated with the SSB, a time domain index associated with the SSB, and/or an SSB index associated with the SSB, among other examples. In some aspects, the base station 110 may transmit, to the repeater 805, an indication to forward an SSB in one or more spatial directions associated with the repeater 805. The repeater 805 may receive the SSB (e.g., based at least in part on the time domain resource allocation and/or the frequency domain resource allocation of the SSB indicated by the base station 110), may generate a signal to repeat the SSB, and may transmit the signal repeating the SSB in one or more spatial directions (e.g., using one or more beams) associated with the repeater 805.

In some aspects, the repeater 805 may support the frequency domain beam sweeping technique described above. For example, the repeater 805 may be associated with L spatial directions to transmit in (e.g., L beams). As shown by reference number 815, the base station 110 may generate a signal for an SSB to be forwarded by the repeater 805 in the L spatial directions. In some aspects, the base station 110 may generate a signal for L copies of an SSB using different frequency domain resource allocations (e.g., different sub-bands) in which the L copies of the SSB are all associated with a spatial direction towards the repeater 805. This may enable the repeater 805 to generate a signal, using the frequency domain beam sweeping technique, to transmit the L copies of an SSB using different frequency domain resource allocations (e.g., different sub-bands) in the L spatial directions at the same time, as described in more detail below. In some aspects, the base station 110 may generate a signal for a single copy of an SSB to be forwarded by the repeater 805 in the L spatial directions.

As shown by reference number 820, the base station 110 may transmit, and the repeater 805 may receive, one or more SSBs. For example, the base station 110 may transmit L copies of an SSB using different frequency domain resource allocations (e.g., different sub-bands). Alternatively, the base station 110 may transmit a single SSB to the repeater 805.

As shown by reference number 825, the repeater 805 may generate one or more signals for SSBs to be forwarded by the repeater 805. For example, if the repeater 805 does not support the frequency domain beam sweeping technique, then the repeater 805 may generate signals for SSBs using an analog beamforming technique in a TDM manner. However, if the repeater 805 does support the frequency domain beam sweeping technique, then the repeater 805 may generate a signal to repeat the SSB(s) received from the base station 110 using the frequency domain beam sweeping technique to generate the signal over the set of spatial directions (e.g., the L spatial directions).

For example, if the base station 110 transmits the L copies of an SSB using different frequency domain resource allocations (e.g., different sub-bands), then the repeater 805 may repeat each SSB using the frequency domain beam sweeping technique. For example, the repeater 805 may generate a signal to repeat each of the L copies of the SSB. The repeater 805 may transmit the L copies of the SSB using frequency domain resource allocations (e.g., sub-bands) corresponding to the frequency domain resource allocations (e.g., sub-bands) in which the L copies of the SSB were received by the repeater 805. Therefore, the repeater 805 may generate a signal to repeat the L copies of the SSB of the L spatial directions at the same time.

If the base station 110 transmits the single copy of the SSB, then the repeater 805 may be required to perform processing to generate L copies of the SSB to be forwarded by the repeater 805. For example, the repeater 805 may process the signal associated with the SSB to convert the signal from an RF signal to a baseband signal. The repeater 805 may filter the baseband signal to isolate a baseband SSB (e.g., to remove any signal outside of the baseband SSB via analog filtering). The repeater 805 may generate a set of copies (e.g., L copies) of the baseband SSB associated with a set of frequency domain resources (e.g., L sub-bands). For example, the repeater 805 may duplicate the baseband SSB to L sub-bands corresponding to the L spatial directions of the repeater 805. The repeater 805 may process the set of copies (e.g., L copies) of the baseband SSB to obtain an RF signal for the set of copies of the SSB. For example, the repeater 805 may up-convert the signal generated from a baseband signal to an RF signal, such that the RF signal includes the L copies of the SSB mapped to the L sub-bands corresponding to the L spatial directions of the repeater 805. As a result, the signal generated by the repeater 805 may include the L copies of the SSB mapped to the L sub-bands and corresponding to the L spatial directions such that the repeater 805 is enabled to transmit the L copies of the SSB in the L spatial directions at the same time (e.g., using the frequency domain beam sweeping technique).

As shown by reference number 830, the repeater 805 may transmit one or more SSBs (e.g., over the L spatial directions) associated with the one or more received SSBs from the base station 110. For example, if the repeater 805 does not support the frequency domain beam sweeping technique, then the repeater 805 may transmit (e.g., forward) SSBs over the L spatial directions using analog beamforming and in a TDM manner. Alternatively, if the repeater 805 does support the frequency domain beam sweeping technique, then the repeater 805 may transmit (e.g., forward) SSBs over the L spatial directions at the same time (e.g., in different sub-bands of a signal, as described above).

As a result, a latency associated with transmitting a set of SSBs (e.g., a latency associated with beam sweeping through a set of SSBs in a TDM manner) may be significantly reduced because the base station 110 and/or the repeater 805 are enabled to transmit multiple SSBs in different directions at the same time. Therefore, a channel acquisition time for a UE 120 that is required to use the repeater 805 to access the base station 110 may be significantly reduced as the time associated with the base station 110 and/or the repeater 805 transmitting multiple SSBs is significantly reduced.

As indicated above, FIG. 8 is provided as an example. Other examples may differ from what is described with respect to FIG. 8.

Figure 9:
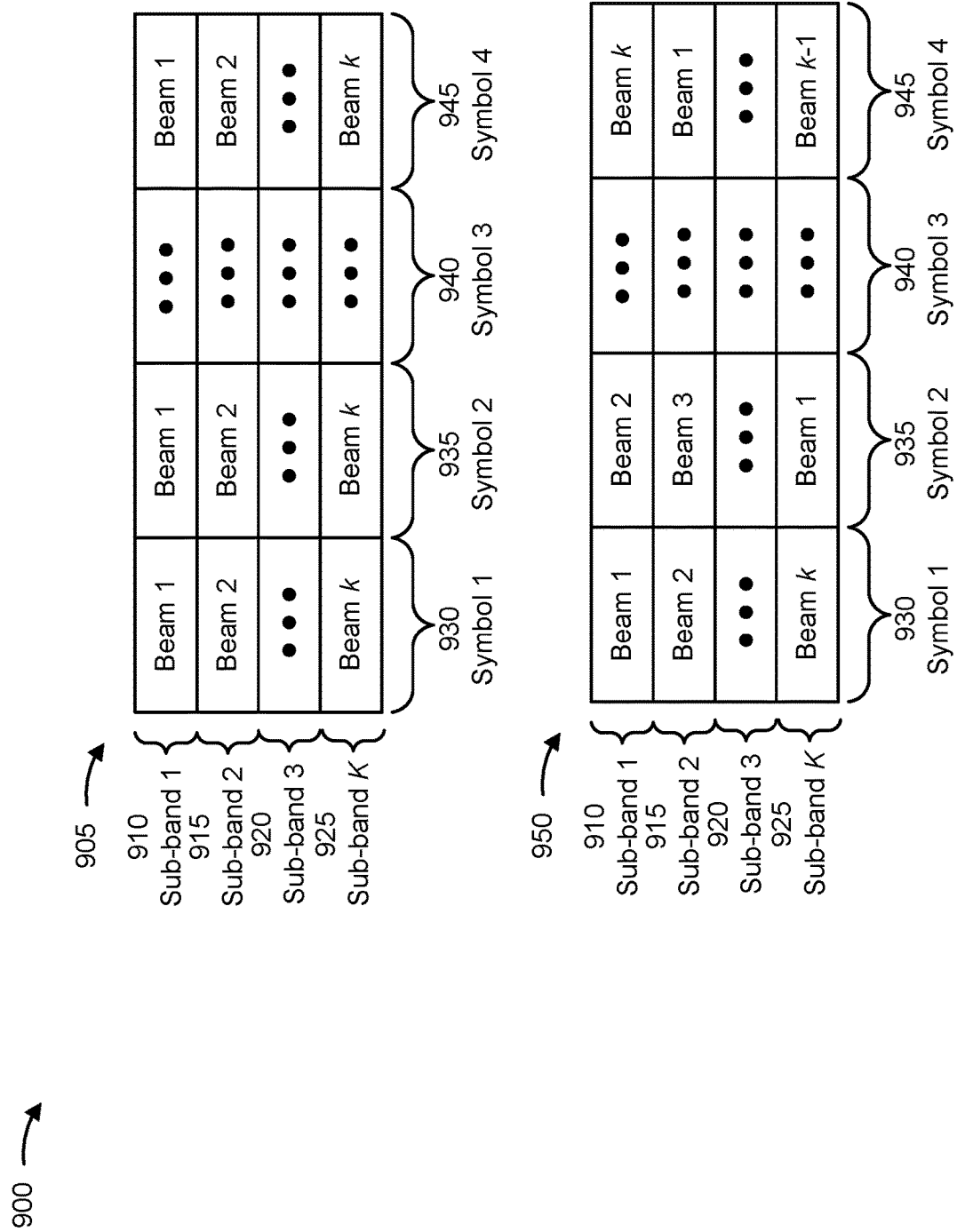
FIGS. 9 and 10 are diagrams illustrating examples of a two-dimensional beam sweeping pattern associated with frequency domain beam sweeping for synchronization signals, in accordance with the present disclosure.

FIG. 9 is a diagram illustrating an example 900 of a two-dimensional beam sweeping pattern associated with frequency domain beam sweeping for synchronization signals, in accordance with the present disclosure. For example, a base station 110 may be associated with K spatial directions over which the base station is to transmit to support a coverage area of the base station 110. The base station 110 may be capable of generating a signal with S copies of an SSB (e.g., in S spatial directions) using the frequency domain beam sweeping technique described above. Additionally, the base station 110 may be enabled to transmit M SSBs in the time domain (e.g., within an SS burst, as described above in connection with FIG. 4). Using the frequency domain beam sweeping technique, the base station 110 may be enabled to transmit SSBs using a two-dimensional beam sweeping pattern (e.g., in the time domain and the frequency domain) to improve channel access for UEs 120 (or other wireless communication devices) within the coverage area of the base station 110.

Example 900 is associated with a two-dimensional beam sweeping patterns in which K is equal to S. Example 900 includes a first two-dimensional beam sweeping pattern 905 and a second two-dimensional beam sweeping pattern 950. As shown in FIG. 9, the base station 110 may be enabled to transmit using K sub-bands (e.g., a first sub-band 910, a second sub-band 915, a third sub-band 920, and a Kth sub-band 925) when generating a signal using the frequency domain beam sweeping technique. Example 900 may be associated with a scenario in which M is equal to four. In other words, the base station 110 may be enabled to transmit in four symbols, or sets of symbols, within an SS burst (e.g., a first symbol 930, a second symbol 935, a third symbol 940, and a fourth symbol 945). As used herein, "symbol" may refer to a time domain resource allocation for an SSB (e.g., within an SS burst), as described above in connection with FIG. 4. For example, as shown in FIG. 9, each symbol may be associated with an SSB. Copies of the SSB may be mapped to the set of K sub-bands (e.g., such that each block in the grid corresponding to a symbol is mapped to a copy of an SSB associated with the symbol).

The first two-dimensional beam sweeping pattern 905 may be associated with each symbol including a full beam sweep across the K spatial directions (e.g., using K beams). Each symbol may be associated with a fixed pattern in the frequency domain. For example, each sub-band may be associated with the same spatial direction, or the same beam, over time. In other words, the base station 110 may transmit a first set of SSBs in a first time domain resource allocation (e.g., the first symbol 930), where the first set of SSBs is mapped to the set of sub-bands in a pattern (e.g., from beam 1 to beam K). The base station 110 may transmit the first set of SSBs in a second time domain resource allocation (e.g., the second symbol 935), where the first set of SSBs is mapped to the set of sub-bands in the same pattern (e.g., from beam 1 to beam K).

The second two-dimensional beam sweeping pattern 950 may be associated with each symbol including a full beam sweep across the K spatial directions (e.g., using K beams), similar to the first two-dimensional beam sweeping pattern 905 described above. However, in the second two-dimensional beam sweeping pattern 950, each symbol may not be associated with a fixed pattern in the frequency domain. For example, the base station 110 may transmit a first set of SSBs in a first time domain resource allocation (e.g., the first symbol 930), where the first set of SSBs is mapped to the set of sub-bands in a first pattern (e.g., from beam 1 to beam K). The base station 110 may transmit the first set of SSBs in a second time domain resource allocation (e.g., the second symbol 935), where the first set of SSBs is mapped to the set of sub-bands in a different (e.g., a second) pattern (e.g., from beam 2 to beam 1). In some aspects, a beam sweep pattern for a first sub-band (e.g., the first sub-band 910) may be a cyclic shift of a beam sweep pattern for a second sub-band (e.g., the second sub-band 915). Additionally, or alternatively, a beam sweep pattern for a first symbol (e.g., the first symbol 930) may be a cyclic shift of a beam sweep pattern for a second symbol (e.g., the second symbol 930).

As described above in connection with FIGS. 7 and 8, the base station 110 may transmit an indication of the two-dimensional beam sweep pattern used by the base station 110 (e.g., may broadcast the two-dimensional beam sweep pattern). For example, the base station 110 may transmit an indication of the two-dimensional beam sweep pattern to a UE 120 and/or a repeater associated with the base station 110. In some aspects, the base station 110 may transmit an indication of the two-dimensional beam sweep pattern using actually transmitted SSB IEs for each sub-band and/or QCL relationship information, as described above. In some aspects, the base station 110 may transmit an indication of SSBs to be forwarded by a repeater by indicating an index (e.g., a sub-band index and/or a symbol index) of the grid or table shown in FIG. 9 to the repeater.

In this way, the base station 110 may perform a two-dimensional beam sweep pattern to improve channel access because each symbol (e.g., each time domain resource allocation for an SSB) includes a full sweep of all spatial directions supported by the base station 110, and the full sweep of all spatial directions supported by the base station 110 is repeated over time (e.g., over different symbols or SSBs of an SS burst). Additionally, the base station 110 may be enabled to vary the beam sweep pattern over time, such that the base station 110 transmits in a spatial direction using different sub-bands over time (thereby improving channel access if a UE 120 experiences poor channel conditions or interference in one sub-band).

As indicated above, FIG. 9 is provided as an example. Other examples may differ from what is described with respect to FIG. 9.

Figure 10:
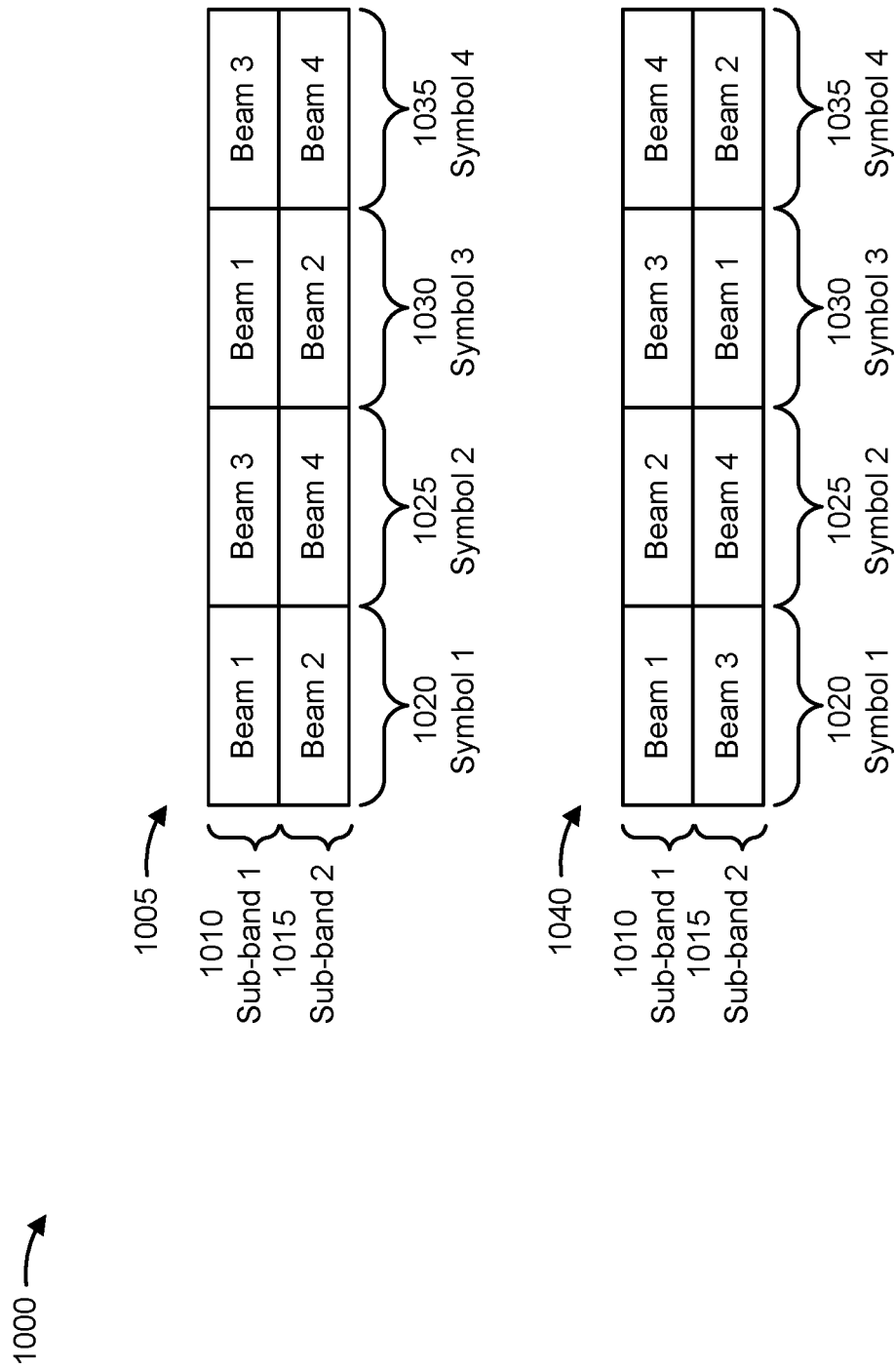

FIG. 10 is a diagram illustrating an example 1000 of a two-dimensional beam sweeping pattern associated with frequency domain beam sweeping for synchronization signals, in accordance with the present disclosure. For example, as described above in connection with FIG. 9, a base station 110 may be associated with K spatial directions over which the base station is to transmit to support a coverage area of the base station 110. The base station 110 may be capable of generating a signal with S copies of an SSB (e.g., in S spatial directions) using the frequency domain beam sweeping technique described above. Additionally, the base station 110 may be enabled to transmit M SSBs in the time domain (e.g., within an SS burst, as described above in connection with FIG. 4). Using the frequency domain beam sweeping technique, the base station 110 may be enabled to transmit SSBs using a two-dimensional beam sweeping pattern (e.g., in the time domain and the frequency domain) to improve channel access for UEs 120 (or other wireless communication devices) within the coverage area of the base station 110.

Example 1000 may be associated with two-dimensional beam sweeping patterns in which K is greater than S. For example, as shown in FIG. 10, K may be equal to four and S may be equal to two. Example 1000 includes a first two-dimensional beam sweeping pattern 1005 and a second two-dimensional beam sweeping pattern 1040. As shown in FIG. 10, the base station 110 may be enabled to transmit using N (e.g., 2) sub-bands (e.g., a first sub-band 1010 and a second sub-band 1015) when generating a signal using the frequency domain beam sweeping technique. Example 1000 may be associated with a scenario in which M is equal to four. In other words, the base station 110 may be enabled to transmit in four symbols, or sets of symbols, within an SS burst (e.g., a first symbol 1020, a second symbol 1025, a third symbol 1030, and a fourth symbol 1035). For example, as shown in FIG. 10, each symbol may be associated with an SSB. Copies of the SSB may be mapped to the set of S sub-bands (e.g., such that each block in the grid corresponding to a symbol is mapped to a copy of an SSB associated with the symbol).

For example, the base station 110 may transmit a first signal (e.g., may transmit a first subset of SSBs from a set of SSBs) in a first time domain resource allocation (e.g., the first symbol 1020), where the first signal includes a set of sub-bands (e.g., first sub-band 1010 and the second sub-band 1015) and the first signal is directed in a first subset of spatial directions of a set of K spatial directions. The base station 110 may transmit a second signal (e.g., may transmit a second subset of SSBs from the set of SSBs) in a second time domain resource allocation (e.g., the second symbol 1025), where the second signal includes the set of sub-bands (e.g., first sub-band 1010 and the second sub-band 1015) and the second signal is directed in a second subset of spatial directions of the set of K spatial directions.

For example, the first two-dimensional beam sweeping pattern 1005 may include mapping SSBs to the set of spatial directions first in the frequency domain and second in the time domain. For example, the first two-dimensional beam sweeping pattern 1005 may include four spatial directions (e.g., beam 1, beam 2, beam 3, and beam 4). The first two-dimensional beam sweeping pattern 1005 may include mapping the set of SSBs to the spatial directions first in the frequency domain (e.g., mapping beam 1 to the first sub-band 1010 in the first symbol 1020 and mapping beam 2 to the second sub-band 1015 in the first symbol 1020). Once all frequency domain allocations are occupied or mapped, the first two-dimensional beam sweeping pattern 1005 may include mapping the set of SSBs to the spatial directions second in the time domain (e.g., mapping beam 3 to the first sub-band 1010 in the second symbol 1025 and mapping beam 4 to the second sub-band 1015 in the second symbol 1025). This pattern may repeat to enable the base station 110 to transmit in all K spatial directions over time using the two-dimensional beam sweeping pattern and the frequency domain beam sweeping technique to generate the signals.

The second two-dimensional beam sweeping pattern 1040 may include mapping spatial directions (e.g., beams) to sub-bands in different time domain patterns. For example, the second two-dimensional beam sweeping pattern 1040 may include mapping spatial directions to the first sub-band 1010 in a first time domain pattern over the four symbols (e.g., with beam 1 in the first symbol 1020, beam 2 in the second symbol 1020, beam 3 in the third symbol 1030, and beam 4 in the fourth symbol 1035). The second two-dimensional beam sweeping pattern 1040 may include mapping spatial directions to the second sub-band 1015 in a second time domain pattern over the four symbols (e.g., with beam 3 in the first symbol 1020, beam 4 in the second symbol 1020, beam 1 in the third symbol 1030, and beam 2 in the fourth symbol 1035). In some aspects, the time domain beam sweep patterns for different sub-bands may be cyclic shifts of each other. For example, the second time domain pattern for the second sub-band 1015 may be a cyclic shift (e.g., a one symbol cyclic shift or a one-point cyclic shift) from the first time domain pattern for the first sub-band 1010. In this way, any K (e.g., four as shown in FIG. 10) adjacent blocks in the grid for the second two-dimensional beam sweeping pattern 1040 may still include a full beam sweep over the K spatial directions (e.g., four as shown in FIG. 10) of the base station 110.

As described above in connection with FIGS. 7, 8, and 9, the base station 110 may transmit an indication of the two-dimensional beam sweep pattern used by the base station 110 (e.g., may broadcast the two-dimensional beam sweep pattern). For example, the base station 110 may transmit an indication of the two-dimensional beam sweep pattern to a UE 120 and/or a repeater associated with the base station 110. In some aspects, the base station 110 may transmit an indication of the two-dimensional beam sweep pattern using actually transmitted SSB IEs for each sub-band and/or QCL relationship information, as described above. In some aspects, the base station 110 may transmit an indication of SSBs to be forwarded by a repeater by indicating an index (e.g., a sub-band index and/or a symbol index) of the grid or table shown in FIG. 10 to the repeater.

In this way, the base station 110 may perform a two-dimensional beam sweep pattern to improve channel access because each symbol (e.g., each time domain resource allocation for an SSB) includes a full sweep of all spatial directions supported by the base station 110, and the full sweep of all spatial directions supported by the base station 110 is repeated over time (e.g., over different symbols or SSBs of an SS burst). Additionally, the base station 110 may be enabled to vary the beam sweep pattern over time, such that the base station 110 transmits in a spatial direction using different sub-bands over time (thereby improving channel access if a UE 120 experiences poor channel conditions or interference in one sub-band).

As indicated above, FIG. 10 is provided as an example. Other examples may differ from what is described with respect to FIG. 10.

FIG. 11 is a diagram illustrating an example process 1100 performed, for example, by a base station, in accordance with the present disclosure. Example process 1100 is an example where the base station (e.g., base station 110) performs operations associated with frequency domain beam sweeping for synchronization signals.

As shown in FIG. 11, in some aspects, process 1100 may optionally include generating a signal for a set of SSBs using a frequency domain beam sweeping technique to generate the signal over a first set of spatial directions, wherein the signal is associated with a frequency domain resource allocation that includes a first set of sub-bands and each sub-band is associated with a spatial direction, of the first set of spatial directions, and an SSB of the set of SSBs (block 1110). For example, the base station (e.g., using signal generation component 1408, depicted in FIG. 14) may generate a signal for a set of SSBs using a frequency domain beam sweeping technique to generate the signal over a first set of spatial directions, wherein the signal is associated with a frequency domain resource allocation that includes a first set of sub-bands and each sub-band is associated with a spatial direction, of the first set of spatial directions, and an SSB of the set of SSBs, as described above, for example, with reference to FIGS. 7, 8, 9, and/or 10.

As further shown in FIG. 11, in some aspects, process 1100 may include transmitting at least a first SSB over a first sub-band in a first spatial direction and a second SSB over a second sub-band in a second spatial direction, wherein the at least the first SSB and the second SSB are transmitted at a same time and wherein the at least the first SSB and the second SSB comprise the set of SSBs, the at least first sub-band and the second sub-band comprise the first set of sub-bands, and the at least first spatial direction and the second spatial direction comprise the first set of spatial directions (block 1120). As block 1120 includes transmitting at least a first SSB and a second SSB, it is understood that block 1120 may further include transmitting a third SSB, a fourth SSB, and so on. For example, the base station (e.g., using transmission component 1404, depicted in FIG. 14) may transmit at least a first SSB over a first sub-band in a first spatial direction and a second SSB over a second sub-band in a second spatial direction, wherein the at least the first SSB and the second SSB are transmitted at a same time and wherein the at least the first SSB and the second SSB comprise the set of SSBs, the at least first sub-band and the second sub-band comprise the first set of sub-bands, and the at least first spatial direction and the second spatial direction comprise the first set of spatial directions, as described above, for example, with reference to FIGS. 7, 8, 9, and/or 10.

Process 1100 may include additional aspects, such as any single aspect or any combination of aspects described below and/or in connection with one or more other processes described elsewhere herein.

In a first aspect, transmitting the at least the first SSB and the second SSB comprises transmitting the first SSB, of the set of SSBs, using a first sub-band of the first set of sub-bands, and a first spatial direction of the first set of spatial directions, and transmitting, at a same time as a transmission time of the first SSB, the second SSB of the set of SSBs, using a second sub-band of the first set of sub-bands, and a second spatial direction of the first set of spatial directions.

In a second aspect, alone or in combination with the first aspect, process 1100 includes communicating, with a different base station, to coordinate at least one of the first set of spatial directions or the first set of sub-bands.

In a third aspect, alone or in combination with one or more of the first and second aspects, process 1100 includes receiving, from one or more UEs, a set of RACH messages at a same time, wherein at least two RACH messages of the set of RACH messages are received in different spatial directions.

In a fourth aspect, alone or in combination with one or more of the first through third aspects, receiving the set of RACH messages comprises receiving, from a first UE of the one or more UEs, a first RACH message of the set of RACH messages in a first spatial direction and a first sub-band, wherein the first spatial direction and the first sub-band are associated with a first SSB, of the set of SSBs, corresponding to the first RACH message, and receiving, from a second UE of the one or more UEs, a second RACH message of the set of RACH messages in a second spatial direction and a second sub-band, wherein the second spatial direction and the second sub-band are associated with a second SSB, of the set of SSBs, corresponding to the second RACH message.

In a fifth aspect, alone or in combination with one or more of the first through fourth aspects, transmitting the at least the first SSB and the second SSB comprises transmitting, to a repeater device, a subset of SSBs of the set of SSBs in a spatial direction, included in the first set of spatial directions, associated with the repeater device and in a subset of sub-bands of the first set of sub-bands, wherein the subset of SSBs is to be forwarded by the repeater device over a second set of spatial directions.

In a sixth aspect, alone or in combination with one or more of the first through fifth aspects, transmitting the at least the first SSB and the second SSB comprises transmitting, to a repeater device, an SSB of the set of SSBs in a spatial direction, included in the first set of spatial directions, associated with the repeater device, wherein a set of copies of the SSB are to be forwarded by the repeater device over a second set of spatial directions and a second set of sub-bands.

In a seventh aspect, alone or in combination with one or more of the first through sixth aspects, transmitting the at least the first SSB and the second SSB comprises transmitting the set of SSBs in a first time domain resource allocation, wherein the set of SSBs is mapped to the first set of sub-bands in a first pattern, and transmitting the set of SSBs in a second time domain resource allocation, wherein the set of SSBs is mapped to the first set of sub-bands in a second pattern.

In an eighth aspect, alone or in combination with one or more of the first through seventh aspects, the first pattern and the second pattern are a same pattern.

In a ninth aspect, alone or in combination with one or more of the first through eighth aspects, the first pattern is a different pattern than the second pattern.

In a tenth aspect, alone or in combination with one or more of the first through ninth aspects, the second pattern is a cyclic shift of the first pattern.

In an eleventh aspect, alone or in combination with one or more of the first through tenth aspects, transmitting the at least the first SSB and the second SSB comprises transmitting a first subset of SSBs, of the set of SSBs, in a first time domain resource allocation, wherein the first subset of SSBs is associated with the set of sub-bands is directed in a first subset of spatial directions of the first set of spatial directions, and transmitting a second subset of SSBs, of the set of SSBs, in a second time domain resource allocation, wherein the second subset of SSBs is associated with the set of sub-bands and are directed in a second subset of spatial directions of the first set of spatial directions.

In a twelfth aspect, alone or in combination with one or more of the first through eleventh aspects, generating the signal for the set of SSBs comprises mapping the set of SSBs to the set of spatial directions first in the frequency domain and second in the time domain.

In a thirteenth aspect, alone or in combination with one or more of the first through twelfth aspects, generating the signal for the set of SSBs comprises mapping the set of SSBs to the set of spatial directions for a first sub-band of the set of sub-bands in a first time domain pattern, and mapping the set of SSBs to the set of spatial directions for a second sub-band of the set of sub-bands in a second time domain pattern.

In a fourteenth aspect, alone or in combination with one or more of the first through thirteenth aspects, the second time domain pattern is a cyclic shift of the first time domain pattern.

In a fifteenth aspect, alone or in combination with one or more of the first through fourteenth aspects, process 1100 includes transmitting an indication of a time domain mapping for the set of SSBs, a frequency domain mapping for the set of SSBs, or a combination thereof.

In a sixteenth aspect, alone or in combination with one or more of the first through fifteenth aspects, transmitting the indication comprises transmitting the indication using information elements indicating actually transmitted SSBs for each sub-band included in the set of sub-bands.

In a seventeenth aspect, alone or in combination with one or more of the first through sixteenth aspects, transmitting the indication comprises transmitting an indication of the first set of sub-bands and a frequency domain resource allocation associated with each sub-band included in the first set of sub-bands.

In an eighteenth aspect, alone or in combination with one or more of the first through seventeenth aspects, transmitting the indication comprises transmitting the indication via at least one of a system information block message, a radio resource control message, or an F1-application protocol message.

In a nineteenth aspect, alone or in combination with one or more of the first through eighteenth aspects, process 1100 includes transmitting an indication of quasi co-location relationship information for SSBs included in the set of SSBs that are transmitted in a same spatial direction of the first set of spatial directions.

In a twentieth aspect, alone or in combination with one or more of the first through nineteenth aspects, process 1100 includes transmitting an indication of a cyclic shift pattern associated with at least one of a time domain beam sweep pattern or a frequency domain beam sweep pattern for the set of SSBs.

In a twenty-first aspect, alone or in combination with one or more of the first through twentieth aspects, process 1100 includes transmitting, to a repeater device, an indication of a time domain resource allocation and a frequency domain resource allocation of an SSB, of the set of SSBs, associated with a spatial direction, included in the first set of spatial directions, towards the repeater device.

In a twenty-second aspect, alone or in combination with one or more of the first through twenty-first aspects, transmitting the indication of the time domain resource allocation and the frequency domain resource allocation of the SSB comprises transmitting an indication of a sub-band index of a sub-band associated with the SSB, a time domain index associated with the SSB, an SSB index associated with the SSB, or any combination thereof.

In a twenty-third aspect, alone or in combination with one or more of the first through twenty-second aspects, process 1100 includes transmitting, to the repeater device, an indication to forward the SSB in one or more spatial directions associated with the repeater device.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with the present disclosure. Example process 1200 is an example where the UE (e.g., UE 120) performs operations associated with frequency domain beam sweeping for synchronization signals.

As shown in FIG. 12, in some aspects, process 1200 may include receiving a signal for an SSB associated with a frequency domain beam sweeping technique (block 1210). For example, the UE (e.g., using reception component 1502, depicted in FIG. 15) may receive a signal for an SSB associated with a frequency domain beam sweeping technique, as described above, for example, with reference to FIGS. 7, 8, 9, and/or 10.

As further shown in FIG. 12, in some aspects, process 1200 may include decoding the signal to identify a spatial direction associated with the SSB based at least in part on a frequency domain resource allocation associated with the SSB (block 1220). For example, the UE (e.g., using signal decoding component 1508, depicted in FIG. 15) may decode the signal to identify a spatial direction associated with the SSB based at least in part on a frequency domain resource allocation associated with the SSB, as described above, for example, with reference to FIGS. 7, 8, 9, and/or 10.

Process 1200 may include additional aspects, such as any single aspect or any combination of aspects described below and/or in connection with one or more other processes described elsewhere herein.

In a first aspect, receiving the signal for the SSB comprises monitoring for signals over a wideband frequency domain resource range that includes one or more sub-bands, and receiving the signal for the SSB using a sub-band included in the one or more sub-bands.

In a second aspect, alone or in combination with the first aspect, decoding the signal comprises detecting the frequency domain resource allocation associated with the SSB, and identifying the spatial direction associated with the SSB based at least in part on the frequency domain resource allocation associated with the SSB.

In a third aspect, alone or in combination with one or more of the first and second aspects, decoding the signal comprises detecting an index associated with the frequency domain resource allocation, and identifying the spatial direction associated with the SSB based at least in part on the index associated with the frequency domain resource allocation.

In a fourth aspect, alone or in combination with one or more of the first through third aspects, process 1200 includes transmitting a message in response to the SSB in the spatial direction associated with the SSB and using a transmit frequency domain resource allocation that is based at least in part on the frequency domain resource allocation associated with the SSB.

In a fifth aspect, alone or in combination with one or more of the first through fourth aspects, the message is a RACH message.

In a sixth aspect, alone or in combination with one or more of the first through fifth aspects, the transmit frequency domain resource allocation is associated with a same sub-band as a sub-band associated with the frequency domain resource allocation associated with the SSB.

In a seventh aspect, alone or in combination with one or more of the first through sixth aspects, process 1200 includes receiving, for a set of SSBs that includes the SSB, an indication of a time domain mapping for the set of SSBs, a frequency domain mapping for the set of SSBs, or any combination thereof.

In an eighth aspect, alone or in combination with one or more of the first through seventh aspects, receiving the indication comprises receiving the indication using information elements indicating actually transmitted SSBs for each sub-band included in a set of sub-bands associated with the set of SSBs.

In a ninth aspect, alone or in combination with one or more of the first through eighth aspects, receiving the indication comprises receiving an indication of a set of sub-bands associated with the set of SSBs and a frequency domain resource allocation associated with each sub-band included in the set of sub-bands.

In a tenth aspect, alone or in combination with one or more of the first through ninth aspects, receiving the indication comprises receiving the indication via at least one of a system information block message or a radio resource control message.

In an eleventh aspect, alone or in combination with one or more of the first through tenth aspects, process 1200 includes receiving an indication of quasi co-location relationship information for a set of SSBs, that includes the SSB, that are transmitted by a base station in a same spatial direction.

In a twelfth aspect, alone or in combination with one or more of the first through eleventh aspects, process 1200 includes receiving an indication of a cyclic shift pattern associated with at least one of a time domain beam sweep pattern or a frequency domain beam sweep pattern for a set of SSBs that includes the SSB.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a repeater device, in accordance with the present disclosure. Example process 1300 is an example where the repeater device (e.g., repeater 805) performs operations associated with frequency domain beam sweeping for synchronization signals.

As shown in FIG. 13, in some aspects, process 1300 may include receiving one or more SSBs, associated with a frequency domain beam sweeping technique, to be forwarded by the repeater device (block 1310). For example, the repeater device (e.g., using reception component 1602, depicted in FIG. 16) may receive one or more SSBs, associated with a frequency domain beam sweeping technique, to be forwarded by the repeater device, as described above, for example, with reference to FIGS. 7, 8, 9, and/or 10.

As further shown in FIG. 13, in some aspects, process 1300 may optionally include generating one or more signals for a set of SSBs, associated with the one or more SSBs, to forward the one or more SSBs over a set of spatial directions (block 1320). For example, the repeater device (e.g., using signal generation component 1608, depicted in FIG. 16) may generate one or more signals for a set of SSBs, associated with the one or more SSBs, to forward the one or more SSBs over a set of spatial directions, as described above, for example, with reference to FIGS. 7, 8, 9, and/or 10.

As further shown in FIG. 13, in some aspects, process 1300 may include transmitting a set of SSBs associated with the one or more received SSBs, wherein SSBs included in the set of SSBs are transmitted using different frequency domain resources and are transmitted in different spatial directions (block 1330). For example, the repeater device (e.g., using transmission component 1604, depicted in FIG. 16) may transmit a set of SSBs associated with the one or more received SSBs, wherein SSBs included in the set of SSBs are transmitted using different frequency domain resources and are transmitted in different spatial directions, as described above, for example, with reference to FIGS. 7, 8, 9, and/or 10.

Process 1300 may include additional aspects, such as any single aspect or any combination of aspects described below and/or in connection with one or more other processes described elsewhere herein.

In a first aspect, receiving the one or more SSBs comprises receiving the set of SSBs, to be forwarded by the repeater device, wherein SSBs included in the set of SSBs are received at a same time and using different frequency domain resources.

In a second aspect, alone or in combination with the first aspect, generating the one or more signals for the set of SSBs comprises generating a signal to repeat the set of SSBs using a frequency domain beam sweeping technique to generate the signal over a set of spatial directions.

In a third aspect, alone or in combination with one or more of the first and second aspects, transmitting the set of SSBs comprises transmitting a signal for the set of SSBs using a frequency domain beam sweeping technique over a set of spatial directions, wherein SSBs included in the set of SSBs are transmitted using different frequency domain resources and in different spatial directions.

In a fourth aspect, alone or in combination with one or more of the first through third aspects, receiving the one or more SSBs comprises receiving an SSB to be forwarded by the repeater device.

In a fifth aspect, alone or in combination with one or more of the first through fourth aspects, generating the one or more signals for the set of SSBs comprises processing a signal associated with the SSB to convert the signal from an RF signal to a baseband signal, filtering the baseband signal to isolate a baseband SSB, generating a set of copies of the SSB associated with a set of frequency domain resources, and processing the set of copies of the baseband SSB to obtain an RF signal for the set of copies of the SSB.

In a sixth aspect, alone or in combination with one or more of the first through fifth aspects, transmitting the set of SSBs comprises transmitting the RF signal for the set of copies of the SSB using a frequency domain beam sweeping technique over a set of spatial directions, wherein copies included in the set of copies of the SSBs are transmitted using different frequency domain resources and in different spatial directions.

In a seventh aspect, alone or in combination with one or more of the first through sixth aspects, process 1300 includes receiving, for a set of SSBs that includes the SSB, an indication of a time domain mapping for the set of SSBs, a frequency domain mapping for the set of SSBs, or any combination thereof.

In an eighth aspect, alone or in combination with one or more of the first through seventh aspects, receiving the indication comprises receiving the indication using information elements indicating actually transmitted SSBs for each sub-band included in a set of sub-bands associated with the set of SSBs.

In a ninth aspect, alone or in combination with one or more of the first through eighth aspects, receiving the indication comprises receiving an indication of a set of sub-bands associated with the set of SSBs and a frequency domain resource allocation associated with each sub-band included in the set of sub-bands.

In a tenth aspect, alone or in combination with one or more of the first through ninth aspects, receiving the indication comprises receiving the indication via at least one of a system information block message, a radio resource control message, or an F1 application protocol message.

In an eleventh aspect, alone or in combination with one or more of the first through tenth aspects, process 1300 includes receiving an indication of quasi co-location relationship information for a set of SSBs, that includes the SSB, that are transmitted by a base station in a same spatial direction.

In a twelfth aspect, alone or in combination with one or more of the first through eleventh aspects, process 1300 includes receiving an indication of a cyclic shift pattern associated with at least one of a time domain beam sweep pattern or a frequency domain beam sweep pattern for a set of SSBs that includes the SSB.

In a thirteenth aspect, alone or in combination with one or more of the first through twelfth aspects, process 1300 includes receiving an indication of a time domain resource allocation and a frequency domain resource allocation of an SSB, of the one or more SSBs, to be forwarded by the repeater device, wherein the SSB is associated with a time domain beam sweeping pattern and a frequency domain beam sweeping pattern.

In a fourteenth aspect, alone or in combination with one or more of the first through thirteenth aspects, receiving the indication of the time domain resource allocation and the frequency domain resource allocation of the SSB comprises receiving an indication of a sub-band index of a sub-band associated with the SSB, a time domain index associated with the SSB, an SSB index associated with the SSB, or any combination thereof.

In a fifteenth aspect, alone or in combination with one or more of the first through fourteenth aspects, process 1300 includes receiving an indication to forward the SSB in one or more spatial directions associated with the repeater device.

In a sixteenth aspect, alone or in combination with one or more of the first through fifteenth aspects, receiving the one or more SSBs comprises receiving the SSB based at least in part on receiving the indication of the time domain resource allocation and the frequency domain resource allocation of the SSB.

In a seventeenth aspect, alone or in combination with one or more of the first through sixteenth aspects, transmitting the set of SSBs comprises transmitting one or more copies of the SSB in one or more spatial directions associated with the repeater device.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
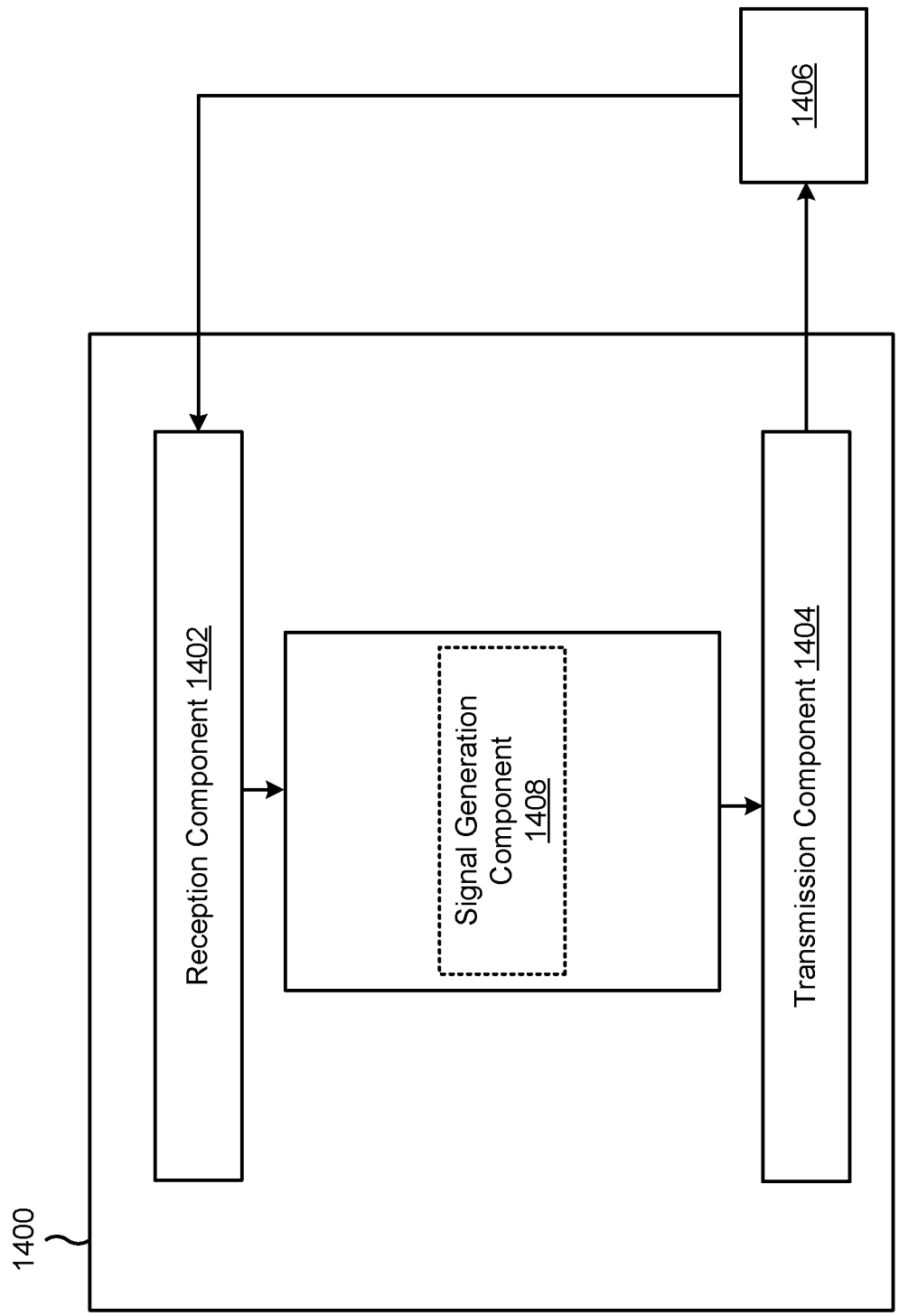
FIGS. 14-16 are block diagrams of example apparatuses for wireless communication, in accordance with the present disclosure.

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a signal generation component 1408, among other examples.

In some aspects, the apparatus 1400 may be configured to perform one or more operations described herein in connection with FIGS. 7, 8, 9, and/or 10. Additionally, or alternatively, the apparatus 1400 may be configured to perform one or more processes described herein, such as process 1100 of FIG. 11, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The signal generation component 1408 may generate a signal for a set of SSBs using a frequency domain beam sweeping technique to generate the signal over a set of spatial directions, wherein the signal is associated with a frequency domain resource allocation that includes a set of sub-bands and each sub-band is associated with a spatial direction, of the set of spatial directions, and an SSB of the set of SSBs. The transmission component 1404 may transmit the signal for the set of SSBs using the frequency domain beam sweeping technique over the set of spatial directions, wherein SSBs included in the set of SSBs are transmitted using different sub-bands and in different spatial directions. The transmission component 1404 may transmit at least a first SSB over a first sub-band in a first spatial direction and a second SSB over a second sub-band in a second spatial direction, wherein the at least the first SSB and the second SSB are transmitted at a same time and wherein the at least the first SSB and the second SSB comprise the set of SSBs, the at least first sub-band and the second sub-band comprise the first set of sub-bands, and the at least first spatial direction and the second spatial direction comprise the first set of spatial directions.

The reception component 1402 and/or the transmission component 1404 may communicate, with a different base station, to coordinate at least one of the set of spatial directions or the set of sub-bands.

The reception component 1402 may receive, from one or more UEs, a set of RACH messages at a same time, wherein at least two RACH messages of the set of RACH messages are received in different spatial directions.

The transmission component 1404 may transmit an indication of a time domain mapping for the set of SSBs, a frequency domain mapping for the set of SSBs, or a combination thereof.

The transmission component 1404 may transmit an indication of quasi co-location relationship information for SSBs included in the set of SSBs that are transmitted in a same spatial direction of the set of spatial directions.

The transmission component 1404 may transmit an indication of a cyclic shift pattern associated with at least one of a time domain beam sweep pattern or a frequency domain beam sweep pattern for the set of SSBs.

The transmission component 1404 may transmit, to a repeater device, an indication of a time domain resource allocation and a frequency domain resource allocation of an SSB, of the set of SSBs, associated with a spatial direction towards the repeater device.

The transmission component 1404 may transmit, to the repeater device, an indication to forward the SSB in one or more spatial directions associated with the repeater device.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
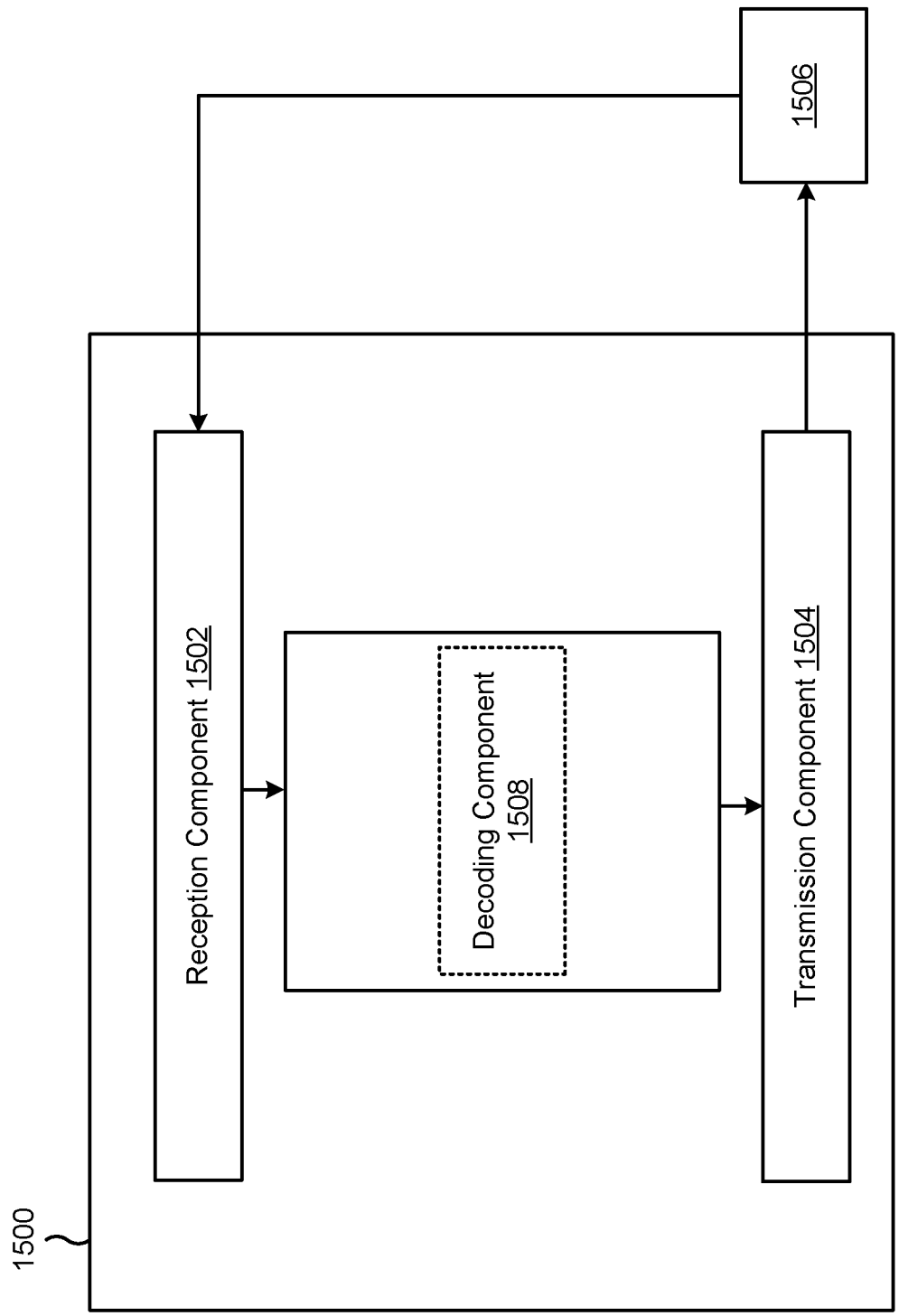

FIG. 15 is a block diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a decoding component 1508, among other examples.

In some aspects, the apparatus 1500 may be configured to perform one or more operations described herein in connection with FIGS. 7, 8, 9, and/or 10. Additionally, or alternatively, the apparatus 1500 may be configured to perform one or more processes described herein, such as process 1200 of FIG. 12, or a combination thereof. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The reception component 1502 may receive a signal for an SSB associated with a frequency domain beam sweeping technique. The decoding component 1508 may decode the signal to identify a spatial direction associated with the SSB based at least in part on a frequency domain resource allocation associated with the SSB.

The transmission component 1504 may transmit a message in response to the SSB in the spatial direction associated with the SSB and using a transmit frequency domain resource allocation that is based at least in part on the frequency domain resource allocation associated with the SSB.

The reception component 1502 may receive, for a set of SSBs that includes the SSB, an indication of a time domain mapping for the set of SSBs, a frequency domain mapping for the set of SSBs, or any combination thereof.

The reception component 1502 may receive an indication of quasi co-location relationship information for a set of SSBs, that includes the SSB, that are transmitted by a base station in a same spatial direction.

The reception component 1502 may receive an indication of a cyclic shift pattern associated with at least one of a time domain beam sweep pattern or a frequency domain beam sweep pattern for a set of SSBs that includes the SSB.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
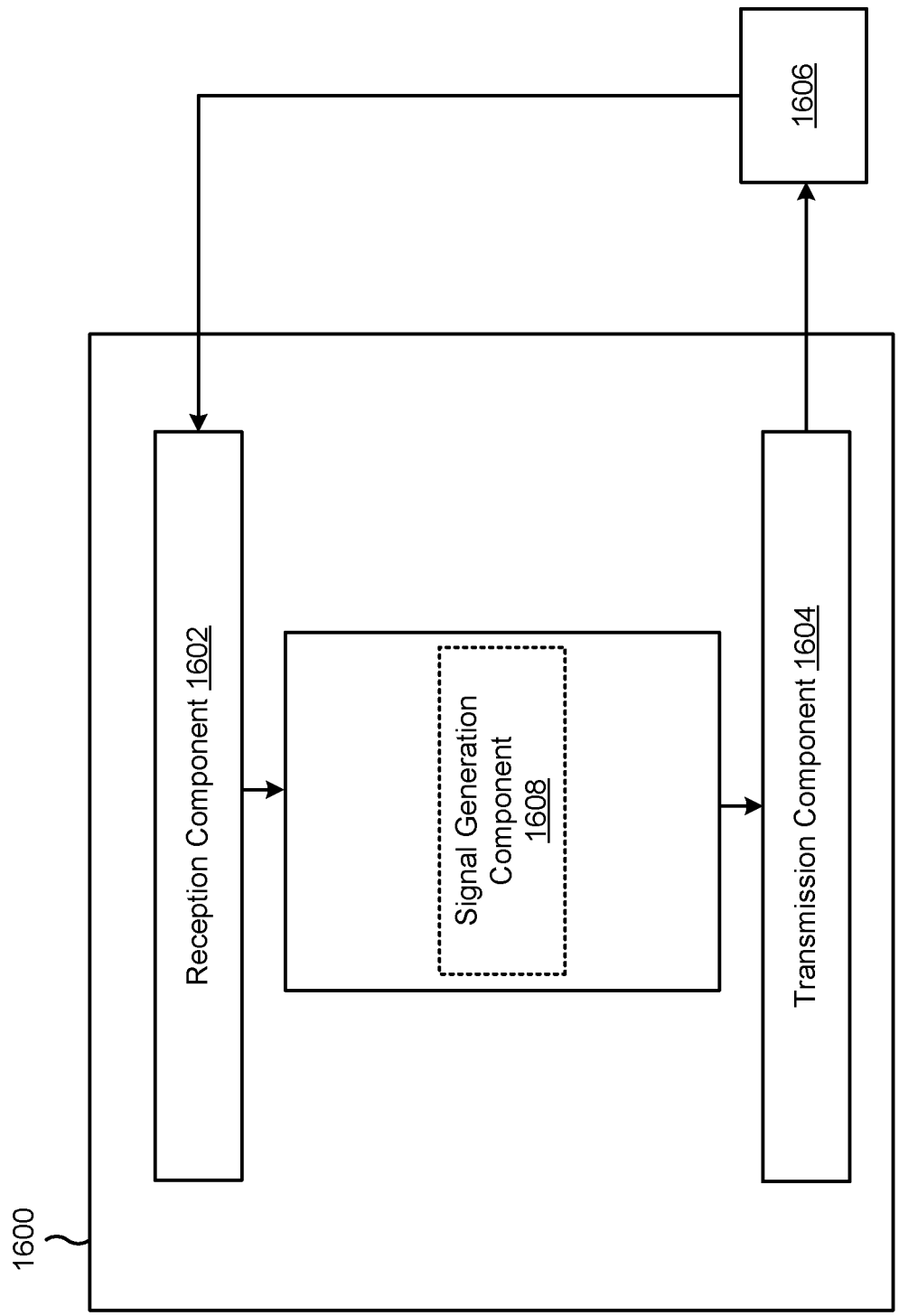

FIG. 16 is a block diagram of an example apparatus 1600 for wireless communication. The apparatus 1600 may be a repeater device, or a repeater device may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a signal generation component 1608, among other examples.

In some aspects, the apparatus 1600 may be configured to perform one or more operations described herein in connection with FIGS. 7, 8, 9, and/or 10. Additionally, or alternatively, the apparatus 1600 may be configured to perform one or more processes described herein, such as process 1300 of FIG. 13, or a combination thereof. In some aspects, the apparatus 1600 and/or one or more components shown in FIG. 16 may include one or more components of the repeater device described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the repeater device described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the repeater device described above in connection with FIG. 2. In some aspects, the transmission component 1604 may be co-located with the reception component 1602 in a transceiver.

The reception component 1602 may receive one or more SSBs, associated with a frequency domain beam sweeping technique, to be forwarded by the repeater device. The signal generation component 1608 may generate one or more signals for a set of SSBs, associated with the one or more SSBs, to forward the one or more SSBs over a set of spatial directions. The transmission component 1604 may transmit the set of SSBs associated with the one or more received SSBs, wherein SSBs included in the set of SSBs are transmitted using different frequency domain resources and are transmitted in different spatial directions.

The signal generation component 1608 may process a signal associated with the SSB to convert the signal from an RF signal to a baseband signal. The signal generation component 1608 may filter the baseband signal to isolate a baseband SSB. The signal generation component 1608 may generate a set of copies of the SSB associated with a set of frequency domain resources. The signal generation component 1608 may process the set of copies of the baseband SSB to obtain an RF signal for the set of copies of the SSB The reception component 1602 may receive, for a set of SSBs that includes the SSB, an indication of a time domain mapping for the set of SSBs, a frequency domain mapping for the set of SSBs, or any combination thereof.

The reception component 1602 may receive an indication of quasi co-location relationship information for a set of SSBs, that includes the SSB, that are transmitted by a base station in a same spatial direction.

The reception component 1602 may receive an indication of a cyclic shift pattern associated with at least one of a time domain beam sweep pattern or a frequency domain beam sweep pattern for a set of SSBs that includes the SSB.

The reception component 1602 may receive an indication of a time domain resource allocation and a frequency domain resource allocation of an SSB, of the one or more SSBs, to be forwarded by the repeater device, wherein the SSB is associated with a time domain beam sweeping pattern and a frequency domain beam sweeping pattern.

The reception component 1602 may receive an indication to forward the SSB in one or more spatial directions associated with the repeater device.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a base station, comprising: generating a signal for a set of synchronization signal blocks (SSBs) using a frequency domain beam sweeping technique to generate the signal over a set of spatial directions, wherein the signal is associated with a frequency domain resource allocation that includes a set of sub-bands and each sub-band is associated with a spatial direction, of the set of spatial directions, and an SSB of the set of SSBs; and transmitting the signal for the set of SSBs using the frequency domain beam sweeping technique over the set of spatial directions, wherein SSBs included in the set of SSBs are transmitted using different sub-bands and in different spatial directions.

Aspect 2: The method of Aspect 1, wherein transmitting the signal for the set of SSBs comprises: transmitting a first SSB, of the set of SSBs, using: a first sub-band of the set of sub-bands, and a first spatial direction of the set of spatial directions; and transmitting, at a same time as a transmission time of the first SSB, a second SSB of the set of SSBs, using: a second sub-band of the set of sub-bands, and a second spatial direction of the set of spatial directions.

Aspect 3: The method of any of Aspects 1-2, further comprising: communicating, with a different base station, to coordinate at least one of the set of spatial directions or the set of sub-bands.

Aspect 4: The method of any of Aspects 1-3, further comprising: receiving, from one or more user equipments (UEs), a set of random access channel (RACH) messages at a same time, wherein at least two RACH messages of the set of RACH messages are received in different spatial directions.

Aspect 5: The method of Aspect 4, wherein receiving the set of RACH messages comprises: receiving, from a first UE of the one or more UEs, a first RACH message of the set of RACH messages in a first spatial direction and a first sub-band, wherein the first spatial direction and the first sub-band are associated with a first SSB, of the set of SSBs, corresponding to the first RACH message; and receiving, from a second UE of the one or more UEs, a second RACH message of the set of RACH messages in a second spatial direction and a second sub-band, wherein the second spatial direction and the second sub-band are associated with a second SSB, of the set of SSBs, corresponding to the second RACH message.

Aspect 6: The method of any of Aspects 1-5, wherein transmitting the signal for the set of SSBs comprises: transmitting, to a repeater device, a subset of SSBs of the set of SSBs in a spatial direction associated with the repeater device and in a subset of sub-bands of the set of sub-bands, wherein the subset of SSBs is to be forwarded by the repeater device over a second set of spatial directions.

Aspect 7: The method of any of Aspects 1-6, wherein transmitting the signal for the set of SSBs comprises: transmitting, to a repeater device, an SSB of the set of SSBs in a spatial direction associated with the repeater device, wherein a set of copies of the SSB are to be forwarded by the repeater device over a second set of spatial directions and a second set of sub-bands.

Aspect 8: The method of any of Aspects 1-7, wherein transmitting the signal for the set of SSBs comprises: transmitting a first signal in a first time domain resource allocation, wherein the first signal includes the set of sub-bands and the set of SSBs mapped to the set of sub-bands in a first pattern; and transmitting a second signal in a second time domain resource allocation, wherein the second signal includes the set of sub-bands and the set of SSBs mapped to the set of sub-bands in a second pattern.

Aspect 9: The method of Aspect 8, wherein the first pattern and the second pattern are a same pattern.

Aspect 10: The method of Aspect 8, wherein the first pattern is a different pattern than the second pattern.

Aspect 11: The method of any of Aspects 8 or 10, wherein the second pattern is a cyclic shift of the first pattern.

Aspect 12: The method of any of Aspects 1-11, wherein transmitting the signal for the set of SSBs comprises: transmitting a first signal in a first time domain resource allocation, wherein the first signal includes the set of sub-bands is directed in a first subset of spatial directions of the set of spatial direction; and transmitting a second signal in a second time domain resource allocation, wherein the second signal includes the set of sub-bands and is directed in a second subset of spatial directions of the set of spatial directions.

Aspect 13: The method of Aspect 12, wherein generating the signal for the set of SSBs comprises: mapping the set of SSBs to the set of spatial directions first in the frequency domain and second in the time domain.

Aspect 14: The method of Aspect 12, wherein generating the signal for the set of SSBs comprises: mapping the set of SSBs to the set of spatial directions for a first sub-band of the set of sub-bands in a first time domain pattern; and mapping the set of SSBs to the set of spatial directions for a second sub-band of the set of sub-bands in a second time domain pattern.

Aspect 15: The method of Aspect 14, wherein the second time domain pattern is a cyclic shift of the first time domain pattern.

Aspect 16: The method of any of Aspects 1-15, further comprising: transmitting an indication of: a time domain mapping for the set of SSBs, a frequency domain mapping for the set of SSBs, or a combination thereof.

Aspect 17: The method of Aspect 16, wherein transmitting the indication comprises: transmitting the indication using information elements indicating actually transmitted SSBs for each sub-band included in the set of sub-bands.

Aspect 18: The method of any of Aspects 16-17, wherein transmitting the indication comprises: transmitting an indication of the set of sub-bands and a frequency domain resource allocation associated with each sub-band included in the set of sub-bands.

Aspect 19: The method of any of Aspects 16-18, wherein transmitting the indication comprises: transmitting the indication via at least one of a system information block message, a radio resource control message, or an F1-application protocol message.

Aspect 20: The method of any of Aspects 1-19, further comprising: transmitting an indication of quasi co-location relationship information for SSBs included in the set of SSBs that are transmitted in a same spatial direction of the set of spatial directions.

Aspect 21: The method of any of Aspects 1-20, further comprising: transmitting an indication of a cyclic shift pattern associated with at least one of a time domain beam sweep pattern or a frequency domain beam sweep pattern for the set of SSBs.

Aspect 22: The method of any of Aspects 1-21, further comprising: transmitting, to a repeater device, an indication of a time domain resource allocation and a frequency domain resource allocation of an SSB, of the set of SSBs, associated with a spatial direction towards the repeater device.

Aspect 23: The method of Aspect 22, wherein transmitting the indication of the time domain resource allocation and the frequency domain resource allocation of the SSB comprises: transmitting an indication of: a sub-band index of a sub-band associated with the SSB, a time domain index associated with the SSB, an SSB index associated with the SSB, or any combination thereof.

Aspect 24: The method of any of Aspects 22-23, further comprising: transmitting, to the repeater device, an indication to forward the SSB in one or more spatial directions associated with the repeater device.

Aspect 25: A method of wireless communication performed by a user equipment (UE), comprising: receiving a signal for a synchronization signal block (SSB) associated with a frequency domain beam sweeping technique; and decoding the signal to identify a spatial direction associated with the SSB based at least in part on a frequency domain resource allocation associated with the SSB.

Aspect 26: The method of Aspect 25, wherein receiving the signal for the SSB comprises: monitoring for signals over a wideband frequency domain resource range that includes one or more sub-bands; and receiving the signal for the SSB using a sub-band included in the one or more sub-bands.

Aspect 27: The method of any of Aspects 25-26, wherein decoding the signal comprises: detecting the frequency domain resource allocation associated with the SSB; and identifying the spatial direction associated with the SSB based at least in part on the frequency domain resource allocation associated with the SSB.

Aspect 28: The method of any of Aspects 25-27, wherein decoding the signal comprises: detecting an index associated with the frequency domain resource allocation; and identifying the spatial direction associated with the SSB based at least in part the index associated with the frequency domain resource allocation.

Aspect 29: The method of any of Aspects 25-28, further comprising: transmitting a message in response to the SSB in the spatial direction associated with the SSB and using a transmit frequency domain resource allocation that is based at least in part on the frequency domain resource allocation associated with the SSB.

Aspect 30: The method of Aspect 29, wherein the message is a random access channel (RACH) message.

Aspect 31: The method of any of Aspects 29-30, wherein the transmit frequency domain resource allocation is associated with a same sub-band as a sub-band associated with the frequency domain resource allocation associated with the SSB.

Aspect 32: The method of any of Aspects 25-31, further comprising: receiving, for a set of SSBs that includes the SSB, an indication of: a time domain mapping for the set of SSBs, a frequency domain mapping for the set of SSBs, or any combination thereof.

Aspect 33: The method of Aspect 32, wherein receiving the indication comprises: receiving the indication using information elements indicating actually transmitted SSBs for each sub-band included in a set of sub-bands associated with the set of SSBs.

Aspect 34: The method of any of Aspects 32-33, wherein receiving the indication comprises: receiving an indication of a set of sub-bands associated with the set of SSBs and a frequency domain resource allocation associated with each sub-band included in the set of sub-bands.

Aspect 35: The method of any of Aspects 32-34, wherein receiving the indication comprises: receiving the indication via at least one of a system information block message or a radio resource control message.

Aspect 36: The method of any of Aspects 25-35, further comprising: receiving an indication of quasi co-location relationship information for a set of SSBs, that includes the SSB, that are transmitted by a base station in a same spatial direction.

Aspect 37: The method of any of Aspects 25-36, further comprising: receiving an indication of a cyclic shift pattern associated with at least one of a time domain beam sweep pattern or a frequency domain beam sweep pattern for a set of SSBs that includes the SSB.

Aspect 38: A method of wireless communication performed by a repeater device, comprising: receiving one or more synchronization signal blocks (SSBs), associated with a frequency domain beam sweeping technique, to be forwarded by the repeater device; generating one or more signals for a set of SSBs, associated with the one or more SSBs, to forward the one or more SSBs over a set of spatial directions; and transmitting the one or more signals for the set of SSBs, wherein SSBs included in the set of SSBs are transmitted using different frequency domain resources and are transmitted in different spatial directions.

Aspect 39: The method of Aspect 38, wherein receiving the one or more SSBs comprises: receiving the set of SSBs, to be forwarded by the repeater device, wherein SSBs included in the set of SSBs are received at a same time and using different frequency domain resources.

Aspect 40: The method of Aspect 39, wherein generating the one or more signals for the set of SSBs comprises: generating a signal to repeat the set of SSBs using a frequency domain beam sweeping technique to generate the signal over a set of spatial directions.

Aspect 41: The method of any of Aspects 39-40, wherein transmitting the one or more signals for the set of SSBs comprises: transmitting a signal for the set of SSBs using a frequency domain beam sweeping technique over a set of spatial directions, wherein SSBs included in the set of SSBs are transmitted using different frequency domain resources and in different spatial directions.

Aspect 42: The method of Aspect 38, wherein receiving the one or more SSBs comprises: receiving an SSB to be forwarded by the repeater device.

Aspect 43: The method of Aspect 42, wherein generating the one or more signals for the set of SSBs comprises: processing a signal associated with the SSB to convert the signal from a radio frequency (RF) signal to a baseband signal; filtering the baseband signal to isolate a baseband SSB; generating a set of copies of the SSB associated with a set of frequency domain resources; and processing the set of copies of the baseband SSB to obtain an RF signal for the set of copies of the SSB.

Aspect 44: The method of Aspect 43, wherein transmitting the one or more signals for the set of SSBs comprises: transmitting the RF signal for the set of copies of the SSB using a frequency domain beam sweeping technique over a set of spatial directions, wherein copies included in the set of copies of the SSBs are transmitted using different frequency domain resources and in different spatial directions.

Aspect 45: The method of any of Aspects 38-44, further comprising: receiving, for a set of SSBs that includes the SSB, an indication of: a time domain mapping for the set of SSBs, a frequency domain mapping for the set of SSBs, or any combination thereof.

Aspect 46: The method of Aspect 45, wherein receiving the indication comprises: receiving the indication using information elements indicating actually transmitted SSBs for each sub-band included in a set of sub-bands associated with the set of SSBs.

Aspect 47: The method of any of Aspects 45-46, wherein receiving the indication comprises: receiving an indication of a set of sub-bands associated with the set of SSBs and a frequency domain resource allocation associated with each sub-band included in the set of sub-bands.

Aspect 48: The method of any of Aspects 45-47, wherein receiving the indication comprises: receiving the indication via at least one of a system information block message, a radio resource control message, or an F1 application protocol message.

Aspect 49: The method of any of Aspects 38-48, further comprising: receiving an indication of quasi co-location relationship information for a set of SSBs, that includes the SSB, that are transmitted by a base station in a same spatial direction.

Aspect 50: The method of any of Aspects 38-49, further comprising: receiving an indication of a cyclic shift pattern associated with at least one of a time domain beam sweep pattern or a frequency domain beam sweep pattern for a set of SSBs that includes the SSB.

Aspect 51: The method of any of Aspects 38-50, further comprising: receiving an indication of a time domain resource allocation and a frequency domain resource allocation of an SSB, of the one or more SSBs, to be forwarded by the repeater device, wherein the SSB is associated with a time domain beam sweeping pattern and a frequency domain beam sweeping pattern.

Aspect 52: The method of Aspect 51, wherein receiving the indication of the time domain resource allocation and the frequency domain resource allocation of the SSB comprises: receiving an indication of: a sub-band index of a sub-band associated with the SSB, a time domain index associated with the SSB, an SSB index associated with the SSB, or any combination thereof.

Aspect 53: The method of any of Aspects 51-52, further comprising: receiving an indication to forward the SSB in one or more spatial directions associated with the repeater device.

Aspect 54: The method of any of Aspects 51-53, wherein receiving the one or more SSBs comprises: receiving the SSB based at least in part on receiving the indication of the time domain resource allocation and the frequency domain resource allocation of the SSB.

Aspect 55: The method of any of Aspects 51-54, wherein transmitting the one or more signals for the set of SSBs comprises: transmitting one or more copies of the SSB in one or more spatial directions associated with the repeater device.

Aspect 56: A method of wireless communication performed by a base station, comprising: transmitting, via a transceiver, at least a first synchronization signal block (SSB) over a first sub-band in a first spatial direction and a second SSB over a second sub-band in a second spatial direction, wherein the at least the first SSB and the second SSB are transmitted at a same time and wherein the at least the first SSB and the second SSB comprise a set of SSBs, the at least first sub-band and the second sub-band comprise a first set of sub-bands, and the at least first spatial direction and the second spatial direction comprise a first set of spatial directions.

Aspect 57: The method of Aspect 56, wherein transmitting the at least the first SSB and the second SSB comprises: transmitting the first SSB, of the set of SSBs, using: a first sub-band of the first set of sub-bands, and a first spatial direction of the first set of spatial directions; and transmitting, at a same time as a transmission time of the first SSB, the second SSB of the set of SSBs, using: a second sub-band of the first set of sub-bands, and a second spatial direction of the first set of spatial directions.

Aspect 58: The method of any of Aspects 56-57, further comprising: communicating, with a different base station, to coordinate at least one of the first set of spatial directions or the first set of sub-bands.

Aspect 59: The method of any of Aspects 56-58, further comprising: receiving, from one or more user equipments (UEs), a set of random access channel (RACH) messages at a same time, wherein at least two RACH messages of the set of RACH messages are received in different spatial directions.

Aspect 60: The method of Aspect 59, wherein receiving the set of RACH messages comprises: receiving, from a first UE of the one or more UEs, a first RACH message of the set of RACH messages in a first spatial direction and a first sub-band, wherein the first spatial direction and the first sub-band are associated with a first SSB, of the set of SSBs, corresponding to the first RACH message; and receiving, from a second UE of the one or more UEs, a second RACH message of the set of RACH messages in a second spatial direction and a second sub-band, wherein the second spatial direction and the second sub-band are associated with a second SSB, of the set of SSBs, corresponding to the second RACH message.

Aspect 61: The method of any of Aspects 56-60, wherein transmitting the at least the first SSB and the second SSB comprises: transmitting, to a repeater device, a subset of SSBs of the set of SSBs in a spatial direction, included in the first set of spatial directions, associated with the repeater device and in a subset of sub-bands of the first set of sub-bands, wherein the subset of SSBs is to be forwarded by the repeater device over a second set of spatial directions.

Aspect 62: The method of any of Aspects 56-61, wherein transmitting the at least the first SSB and the second SSB comprises: transmitting, to a repeater device, an SSB of the set of SSBs in a spatial direction, included in the first set of spatial directions, associated with the repeater device, wherein a set of copies of the SSB are to be forwarded by the repeater device over a second set of spatial directions and a second set of sub-bands.

Aspect 63: The method of any of Aspects 56-62, wherein transmitting the at least the first SSB and the second SSB, comprises: transmitting the set of SSBs in a first time domain resource allocation, wherein the set of SSBs is mapped to the first set of sub-bands in a first pattern; and transmitting the set of SSBs in a second time domain resource allocation, wherein the set of SSBs is mapped to the first set of sub-bands in a second pattern.

Aspect 64: The method of Aspect 63, wherein the first pattern and the second pattern are a same pattern.

Aspect 65: The method of Aspect 63, wherein the first pattern is a different pattern than the second pattern.

Aspect 66: The method of any of Aspects 63 and 65, wherein the second pattern is a cyclic shift of the first pattern.

Aspect 67: The method of any of Aspects 56-67, wherein transmitting the at least the first SSB and the second SSB comprises: transmitting a first subset of SSBs, of the set of SSBs, in a first time domain resource allocation, wherein the first subset of SSBs is associated with the set of sub-bands and are directed in a first subset of spatial directions of the first set of spatial direction; and transmitting a second subset of SSBs, of the set of SSBs, in a second time domain resource allocation, wherein the second subset of SSBs is associated with the set of sub-bands and are directed in a second subset of spatial directions of the set of spatial directions.

Aspect 68: The method of Aspect 67, further comprising: mapping the set of SSBs to the first set of spatial directions first in the frequency domain and second in the time domain.

Aspect 69: The method of any of Aspects 67-68, further comprising: mapping the set of SSBs to the first set of spatial directions for a first sub-band of the first set of sub-bands in a first time domain pattern; and mapping the set of SSBs to the first set of spatial directions for a second sub-band of the first set of sub-bands in a second time domain pattern.

Aspect 70: The method of Aspect 69, wherein the second time domain pattern is a cyclic shift of the first time domain pattern.

Aspect 71: The method of any of Aspects 56-70, further comprising: transmitting an indication of: a time domain mapping for the set of SSBs, a frequency domain mapping for the set of SSBs, or a combination thereof.

Aspect 72: The method of Aspect 71, wherein transmitting the indication comprises: transmitting the indication using information elements indicating actually transmitted SSBs for each sub-band included in the first set of sub-bands.

Aspect 73: The method of any of Aspects 71-72, wherein transmitting the indication comprises: transmitting an indication of the first set of sub-bands and a frequency domain resource allocation associated with each sub-band included in the first set of sub-bands.

Aspect 74: The method of any of Aspects 71-73, wherein transmitting the indication comprises: transmitting the indication via at least one of a system information block message, a radio resource control message, or an F1-application protocol message.

Aspect 75: The method of any of Aspects 56-74, further comprising: transmitting an indication of quasi co-location relationship information for SSBs included in the set of SSBs that are transmitted in a same spatial direction of the first set of spatial directions.

Aspect 76: The method of any of Aspects 56-75, further comprising: transmitting an indication of a cyclic shift pattern associated with at least one of a time domain beam sweep pattern or a frequency domain beam sweep pattern for the set of SSBs.

Aspect 77: The method of any of Aspects 56-76, further comprising: transmitting, to a repeater device, an indication of a time domain resource allocation and a frequency domain resource allocation of an SSB, of the set of SSBs, associated with a spatial direction towards the repeater device.

Aspect 78: The method of Aspect 77, wherein transmitting the indication of the time domain resource allocation and the frequency domain resource allocation of the SSB comprises: transmitting an indication of: a sub-band index of a sub-band associated with the SSB, a time domain index associated with the SSB, an SSB index associated with the SSB, or any combination thereof.

Aspect 79: The method of any of Aspects 77-78, further comprising: transmitting, to the repeater device, an indication to forward the SSB in one or more spatial directions associated with the repeater device.

Aspect 80: A method of wireless communication performed by a repeater device, comprising: receiving one or more synchronization signal blocks (SSBs), associated with a frequency domain beam sweeping technique, to be forwarded by the repeater device; transmitting a set of SSBs associated with the one or more received SSBs, wherein SSBs included in the set of SSBs are transmitted using different frequency domain resources and are transmitted in different spatial directions.

Aspect 81: The method of Aspect 80, wherein receiving the one or more SSBs comprises: receiving the one or more SSBs, to be forwarded by the repeater device, wherein SSBs included in the one or more SSBs are received at a same time and using different frequency domain resources.

Aspect 82: The method of Aspect 81, further comprising: generating a signal to repeat the set of SSBs using a frequency domain beam sweeping technique to generate the signal over a set of spatial directions.

Aspect 83: The method of any of Aspects 81-82, wherein transmitting the set of SSBs comprises: transmitting a signal for the set of SSBs using a frequency domain beam sweeping technique over a set of spatial directions, wherein SSBs included in the set of SSBs are transmitted using different frequency domain resources and in different spatial directions.

Aspect 84: The method of any of Aspects 80-83, wherein receiving the one or more SSBs comprises: receiving an SSB to be forwarded by the repeater device.

Aspect 85: The method of Aspect 84, further comprising: processing a signal associated with the SSB to convert the signal from a radio frequency (RF) signal to a baseband signal; filtering the baseband signal to isolate a baseband SSB; generating a set of copies of the SSB associated with a set of frequency domain resources; and processing the set of copies of the baseband SSB to obtain an RF signal for the set of copies of the SSB.

Aspect 86: The method of Aspect 85, wherein transmitting the set of SSBs comprises: transmitting the RF signal for the set of copies of the SSB using a frequency domain beam sweeping technique over a set of spatial directions, wherein copies included in the set of copies of the SSBs are transmitted using different frequency domain resources and in different spatial directions.

Aspect 87: The method of any of Aspects 80-86, further comprising: receiving, for the set of SSBs, an indication of: a time domain mapping for the set of SSBs, a frequency domain mapping for the set of SSBs, or any combination thereof.

Aspect 88: The method of Aspect 87, wherein receiving the indication comprises: receiving the indication using information elements indicating actually transmitted SSBs for each sub-band included in a set of sub-bands associated with the set of SSBs.

Aspect 89: The method of any of Aspects 87-88, wherein receiving the indication comprises: receiving an indication of a set of sub-bands associated with the set of SSBs and a frequency domain resource allocation associated with each sub-band included in the set of sub-bands.

Aspect 90: The method of any of Aspects 87-89, wherein receiving the indication comprises: receiving the indication via at least one of a system information block message, a radio resource control message, or an F1 application protocol message.

Aspect 91: The method of any of Aspects 80-90, further comprising: receiving an indication of quasi co-location relationship information for the set of SSBs, that are transmitted by a base station in a same spatial direction.

Aspect 92: The method of any of Aspects 80-91, further comprising: receiving an indication of a cyclic shift pattern associated with at least one of a time domain beam sweep pattern or a frequency domain beam sweep pattern for the set of SSBs.

Aspect 93: The method of any of Aspects 80-92, further comprising: receiving an indication of a time domain resource allocation and a frequency domain resource allocation of an SSB, of the one or more SSBs, to be forwarded by the repeater device, wherein the SSB is associated with a time domain beam sweeping pattern and a frequency domain beam sweeping pattern.

Aspect 94: The method of Aspect 93, wherein receiving the indication of the time domain resource allocation and the frequency domain resource allocation of the SSB comprises: receiving an indication of: a sub-band index of a sub-band associated with the SSB, a time domain index associated with the SSB, an SSB index associated with the SSB, or any combination thereof.

Aspect 95: The method of any of Aspects 93-94, further comprising: receiving an indication to forward the SSB in one or more spatial directions associated with the repeater device.

Aspect 96: The method of any of Aspects 93-95, wherein receiving the one or more SSBs comprises: receiving the SSB based at least in part on receiving the indication of the time domain resource allocation and the frequency domain resource allocation of the SSB.

Aspect 97: The method of any of Aspects 93-96, wherein transmitting the one or more signals for the set of SSBs comprises: transmitting one or more copies of the SSB in one or more spatial directions associated with the repeater device.

Aspect 98: An apparatus for wireless communication at a device, comprising a processor; memory coupled with the processor; and instructions stored in the memory and executable by the processor to cause the apparatus to perform the method of one or more Aspects 1-24 and 56-79.

Aspect 99: A device for wireless communication, comprising a memory and one or more processors coupled to the memory, the memory and the one or more processors configured to perform the method of one or more Aspects 1-24 and 56-79.

Aspect 100: An apparatus for wireless communication, comprising at least one means for performing the method of one or more of Aspects 1-24 and 56-79.

Aspect 101: A non-transitory computer-readable medium storing code for wireless communication, the code comprising instructions executable by a processor to perform the method of one or more of Aspects 1-24 and 56-79.

Aspect 102: A non-transitory computer-readable medium storing a set of instructions for wireless communication, the set of instructions comprising one or more instructions that, when executed by one or more processors of a device, cause the device to perform the method of one or more of Aspects 1-24 and 56-79.

Aspect 103: An apparatus for wireless communication at a device, comprising a processor; memory coupled with the processor; and instructions stored in the memory and executable by the processor to cause the apparatus to perform the method of one or more of Aspects 25-37.

Aspect 104: A device for wireless communication, comprising a memory and one or more processors coupled to the memory, the memory and the one or more processors configured to perform the method of one or more of Aspects 25-37.

Aspect 105: An apparatus for wireless communication, comprising at least one means for performing the method of one or more of Aspects 25-37.

Aspect 106: A non-transitory computer-readable medium storing code for wireless communication, the code comprising instructions executable by a processor to perform the method of one or more of Aspects 25-37.

Aspect 107: A non-transitory computer-readable medium storing a set of instructions for wireless communication, the set of instructions comprising one or more instructions that, when executed by one or more processors of a device, cause the device to perform the method of one or more of Aspects 25-37.

Aspect 108: An apparatus for wireless communication at a device, comprising a processor; memory coupled with the processor; and instructions stored in the memory and executable by the processor to cause the apparatus to perform the method of one or more of Aspects 38-55 and 80-97.

Aspect 109: A device for wireless communication, comprising a memory and one or more processors coupled to the memory, the memory and the one or more processors configured to perform the method of one or more of Aspects 38-55 and 80-97.

Aspect 110: An apparatus for wireless communication, comprising at least one means for performing the method of one or more of Aspects 38-55 and 80-97.

Aspect 111: A non-transitory computer-readable medium storing code for wireless communication, the code comprising instructions executable by a processor to perform the method of one or more of Aspects 38-55 and 80-97.

Aspect 112: A non-transitory computer-readable medium storing a set of instructions for wireless communication, the set of instructions comprising one or more instructions that, when executed by one or more processors of a device, cause the device to perform the method of one or more of Aspects 38-55 and 80-97.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A base station for wireless communication, comprising:
   a memory; and
   one or more processors, coupled to the memory, configured to:
      generate a signal using a frequency domain beam sweeping technique that is based at least in part on a set of beamforming weights and a set of time delays; and
      transmit, via a transceiver, a first portion of the signal over a first sub-band in a first spatial direction and a second portion of the signal over a second sub-band in a second spatial direction, wherein:
         the first portion of the signal and the second portion of the signal are transmitted at a same time,
         the first portion of the signal comprises a first synchronization signal block (SSB),
         the second portion of the signal comprises a second SSB,
         the first SSB is associated with a first sub-band index of the first sub-band,
         the second SSB is associated with a second sub-band index of the second sub-band,
         the first SSB and the second SSB comprise a set of SSBs,
         the first sub-band and the second sub-band comprise a first set of sub-bands, and
         the first spatial direction and the second spatial direction comprise a first set of spatial directions.

2. The base station of claim 1, wherein the one or more processors are further configured to:
   receive, from one or more user equipments (UEs), a set of random access channel (RACH) messages at a same time, wherein at least two RACH messages of the set of RACH messages are received in different spatial directions.

3. The base station of claim 1, wherein the one or more processors, to transmit the set of SSBs, are configured to:
   transmit, to a repeater device, a subset of SSBs of the set of SSBs in a spatial direction, included in the first set of spatial directions, associated with the repeater device and in a subset of sub-bands of the first set of sub-bands, wherein the subset of SSBs is to be forwarded by the repeater device over a second set of spatial directions.

4. The base station of claim 1, wherein the one or more processors, to transmit the set of SSBs, are configured to:
   transmit, to a repeater device, an SSB of the set of SSBs in a spatial direction, included in the first set of spatial directions, associated with the repeater device, wherein a set of copies of the SSB are to be forwarded by the repeater device over a second set of spatial directions and a second set of sub-bands.

5. The base station of claim 1, wherein the one or more processors, to transmit the set of SSBs, are configured to:
   transmit the set of SSBs in a first time domain resource allocation, wherein the set of SSBs is mapped to the first set of sub-bands in a first pattern; and transmit the set of SSBs in a second time domain resource allocation, wherein the first set of SSBs is mapped to the first set of sub-bands in a second pattern.

6. The base station of claim 1, wherein the one or more processors, to transmit the set of SSBs, are configured to:
transmit a first subset of SSBs of the set of SSBs in a first time domain resource allocation, wherein the first subset of SSBs is associated with the first set of sub-bands and is directed in a first subset of spatial directions of the first set of spatial directions; and
transmit a second subset of SSBs of the set of SSBs in a second time domain resource allocation, wherein the second subset of SSBs is associated with the first set of sub-bands and is directed in a second subset of spatial directions of the first set of spatial directions.

7. The base station of claim 1, wherein the one or more processors are further configured to:
transmit an indication of:
a time domain mapping for the set of SSBs,
a frequency domain mapping for the set of SSBs, or
a combination thereof.

8. The base station of claim 1, wherein the one or more processors are further configured to:
transmit an indication of quasi co-location relationship information for SSBs included in the set of SSBs that are transmitted in a same spatial direction of the first set of spatial directions.

9. The base station of claim 1, wherein the one or more processors are further configured to:
transmit, to a repeater device, an indication of a time domain resource allocation and a frequency domain resource allocation of an SSB, of the set of SSBs, associated with a spatial direction, included in the first set of spatial directions, towards the repeater device, wherein the indication of the time domain resource allocation and the frequency domain resource allocation includes an indication of at least one of:
a sub-band index of a sub-band associated with the SSB,
a time domain index associated with the SSB,
an SSB index associated with the SSB, or
any combination thereof.

10. A repeater device for wireless communication, comprising:
a memory;
a transceiver; and
one or more processors, coupled to the memory and the transceiver, configured to:
receive, via the transceiver, one or more synchronization signal blocks (SSBs), associated with a frequency domain beam sweeping technique that is based at least in part on a set of beamforming weights and a set of time delays, to be forwarded by the repeater device; and
transmit, via the transceiver, a first portion of a signal associated with the one or more received SSBs over a first sub-band in a first spatial direction and a second portion of the signal over a second sub-band in a second spatial direction, wherein:
the first portion of the signal comprises a first SSB,
the second portion of the signal comprises a second SSB,
the first SSB is associated with a first sub-band index of the first sub-band,
the second SSB is associated with a second sub-band index of the second sub-band,
the first SSB and the second SSB comprise a set of SSBs,
the first sub-band and the second sub-band comprise a first set of sub-bands, and
the first spatial direction and the second spatial direction comprise a first set of spatial directions.

11. The repeater device of claim 10, wherein the one or more processors, to receive the one or more SSBs, are configured to:
receive the set of SSBs, to be forwarded by the repeater device, wherein SSBs included in the set of SSBs are received at a same time and using different frequency domain resources.

12. The repeater device of claim 11, wherein the one or more processors, to transmit the set of SSBs, are configured to:
transmit the set of SSBs using a frequency domain beam sweeping technique over the first set of spatial directions, wherein SSBs included in the set of SSBs are transmitted using different frequency domain resources and in different spatial directions.

13. The repeater device of claim 10, wherein the one or more processors, to transmit the set of SSBs, are configured to:
transmit the set of SSBs at a same time.

14. The repeater device of claim 10, wherein the one or more processors are further configured to:
process a second signal associated with an SSB, of the one or more SSBs, to convert the second signal from a radio frequency (RF) signal to a baseband signal;
filter the baseband signal to isolate a baseband SSB;
generate a set of copies of the SSB associated with a set of frequency domain resources; and
process the set of copies of the baseband SSB to obtain the signal for the set of copies of the SSB.

15. The repeater device of claim 10, wherein the one or more processors are further configured to:
receive an indication of a time domain resource allocation and a frequency domain resource allocation of an SSB, of the one or more SSBs, associated with a spatial direction, included in a second set of spatial directions, towards the repeater device, wherein the indication of the time domain resource allocation and the frequency domain resource allocation includes an indication of at least one of:
a sub-band index of a sub-band associated with the SSB,
a time domain index associated with the SSB,
an SSB index associated with the SSB, or
any combination thereof.

16. A method of wireless communication performed by a base station, comprising:
generating a signal using a frequency domain beam sweeping technique that is based at least in part on a set of beamforming weights and a set of time delays; and
transmitting, via a transceiver, a first portion of the signal over a first sub-band in a first spatial direction and a second portion of the signal over a second sub-band in a second spatial direction, wherein:
the first portion of the signal and the second portion of the signal are transmitted at a same time,
the first portion of the signal comprises a first synchronization signal block (SSB),
the second portion of the signal comprises a second SSB,
the first SSB is associated with a first sub-band index of the first sub-band, the second SSB is associated with a second sub-band index of the second sub-band, the first SSB and the second SSB comprise a set of SSBs, the first sub-band and the second sub-band comprise a first set of sub-bands, and the first spatial direction and the second spatial direction comprise a first set of spatial directions.

17. The method of claim 16, further comprising:
receiving, from one or more user equipments (UEs), a set of random access channel (RACH) messages at a same time, wherein at least two RACH messages of the set of RACH messages are received in different spatial directions.

18. The method of claim 16, wherein transmitting the set of SSBs comprises:
transmitting, to a repeater device, a subset of SSBs of the set of SSBs in a spatial direction, included in the first set of spatial directions, associated with the repeater device and in a subset of sub-bands of the first set of sub-bands, wherein the subset of SSBs is to be forwarded by the repeater device over a second set of spatial directions.

19. The method of claim 16, wherein transmitting the set of SSBs comprises:
transmitting, to a repeater device, an SSB of the set of SSBs in a spatial direction, included in the first set of spatial directions, associated with the repeater device, wherein a set of copies of the SSB are to be forwarded by the repeater device over a second set of spatial directions and a second set of sub-bands.

20. The method of claim 16, wherein transmitting the set of SSBs comprises:
transmitting the set of SSBs in a first time domain resource allocation, wherein the set of SSBs is mapped to the first set of sub-bands in a first pattern; and
transmitting the set of SSBs in a second time domain resource allocation, wherein the set of SSBs is mapped to the first set of sub-bands in a second pattern.

21. The method of claim 16, wherein transmitting the set of SSBs comprises:
transmitting a first subset of SSBs of the set of SSBs in a first time domain resource allocation, wherein the first subset of SSBs is associated with the first set of sub-bands and is directed in a first subset of spatial directions of the first set of spatial directions; and
transmitting a second subset of SSBs of the set of SSBs in a second time domain resource allocation, wherein the second subset of SSBs is associated with the first set of sub-bands and is directed in a second subset of spatial directions of the first set of spatial directions.

22. The method of claim 16, further comprising:
transmitting an indication of:
a time domain mapping for the set of SSBs,
a frequency domain mapping for the set of SSBs, or
a combination thereof.

23. The method of claim 16, further comprising:
transmitting an indication of quasi co-location relationship information for SSBs included in the set of SSBs that are transmitted in a same spatial direction of the first set of spatial directions.

24. The method of claim 16, further comprising:
transmitting, to a repeater device, an indication of a time domain resource allocation and a frequency domain resource allocation of an SSB, of the set of SSBs, associated with a spatial direction, included in the first set of spatial directions, towards the repeater device, wherein the indication of the time domain resource allocation and the frequency domain resource allocation includes an indication of at least one of:
a sub-band index of a sub-band associated with the SSB,
a time domain index associated with the SSB,
an SSB index associated with the SSB, or
any combination thereof.

25. A method of wireless communication performed by a repeater device, comprising:
receiving, via a transceiver, one or more synchronization signal blocks (SSBs), associated with a frequency domain beam sweeping technique that is based at least in part on a set of beamforming weights and a set of time delays, to be forwarded by the repeater device; and
transmitting, via the transceiver, a first portion of a signal associated with the one or more received SSBs over a first sub-band in a first spatial direction and a second portion of the signal over a second sub-band in a second spatial direction, wherein:
the first portion of the signal comprises a first SSB,
the second portion of the signal comprises a second SSB,
the first SSB is associated with a first sub-band index of the first sub-band,
the second SSB is associated with a second sub-band index of the second sub-band,
the first SSB and the second SSB comprise a set of SSBs,
the first sub-band and the second sub-band comprise a first set of sub-bands, and
the first spatial direction and the second spatial direction comprise a first set of spatial directions.

26. The method of claim 25, wherein receiving the one or more SSBs comprises:
receiving the set of SSBs, to be forwarded by the repeater device, wherein SSBs included in the set of SSBs are received at a same time and using different frequency domain resources.

27. The method of claim 26, wherein transmitting the set of SSBs comprises:
transmitting the set of SSBs using a frequency domain beam sweeping technique over the first set of spatial directions, wherein SSBs included in the set of SSBs are transmitted using different frequency domain resources and in different spatial directions.

28. The method of claim 25, wherein transmitting the set of SSBs comprises:
transmitting the set of SSBs at a same time.

29. The method of claim 25, further comprising:
Processing a second signal associated with an SSB, of the one or more SSBs, to convert the second signal from a radio frequency (RF) signal to a baseband signal;
filtering the baseband signal to isolate a baseband SSB;
generating a set of copies of the SSB associated with a set of frequency domain resources; and
processing the set of copies of the baseband SSB to obtain the signal for the set of copies of the SSB.

30. The method of claim 25, further comprising:
receiving an indication of a time domain resource allocation and a frequency domain resource allocation of an SSB, of the one or more SSBs, associated with a spatial direction, included in a second set of spatial directions, towards the repeater device, wherein the indication of the time domain resource allocation and the frequency domain resource allocation includes an indication of at least one of:

a sub-band index of a sub-band associated with the SSB,
a time domain index associated with the SSB,
an SSB index associated with the SSB, or
any combination thereof.

* * * * *